(12) United States Patent
Gu et al.

(10) Patent No.: US 9,034,812 B2
(45) Date of Patent: May 19, 2015

(54) COMPOSITIONS AND METHODS FOR TREATING BIOFILMS

(75) Inventors: Tingyue Gu, Athens, OH (US); Dake Xu, Athens, OH (US)

(73) Assignee: Ohio University, Athens, OH (US)

( * ) Notice: Subject to any disclaimer, the term of this patent is extended or adjusted under 35 U.S.C. 154(b) by 0 days.

(21) Appl. No.: 14/241,217

(22) PCT Filed: Aug. 26, 2012

(86) PCT No.: PCT/US2012/052417
§ 371 (c)(1),
(2), (4) Date: Feb. 26, 2014

(87) PCT Pub. No.: WO2013/032961
PCT Pub. Date: Mar. 7, 2013

(65) Prior Publication Data
US 2014/0194335 A1    Jul. 10, 2014

Related U.S. Application Data

(60) Provisional application No. 61/527,941, filed on Aug. 26, 2011.

(51) Int. Cl.
| | | |
|---|---|---|
| C11D 3/48 | (2006.01) | |
| C11D 3/30 | (2006.01) | |
| C11D 7/34 | (2006.01) | |
| C11D 7/36 | (2006.01) | |
| C02F 1/50 | (2006.01) | |
| C02F 1/76 | (2006.01) | |

(52) U.S. Cl.
CPC ... C11D 3/48 (2013.01); C02F 1/50 (2013.01); C02F 1/76 (2013.01); C02F 1/766 (2013.01); C02F 2303/08 (2013.01); C02F 2303/20 (2013.01)

(58) Field of Classification Search
CPC .............. C11D 3/48; C11D 3/30; C11D 7/34; C11D 7/36; C11D 7/3245
See application file for complete search history.

(56) References Cited

U.S. PATENT DOCUMENTS

| | | | | |
|---|---|---|---|---|
| 6,475,434 | B1 * | 11/2002 | Darouiche | 422/28 |
| 2002/0016278 | A1 * | 2/2002 | Barbeau et al. | 510/382 |
| 2003/0194445 | A1 | 10/2003 | Kuhner et al. | |
| 2007/0281904 | A1 | 12/2007 | Baker et al. | |
| 2010/0269731 | A1 | 10/2010 | Tofte Jespersen et al. | |
| 2011/0070376 | A1 | 3/2011 | Wales et al. | |
| 2012/0087993 | A1 * | 4/2012 | Martin | 424/661 |
| 2012/0114728 | A1 * | 5/2012 | Whitekettle et al. | 424/420 |
| 2014/0056951 | A1 * | 2/2014 | Losick et al. | 424/400 |
| 2014/0221318 | A1 * | 8/2014 | Yin | 514/129 |

FOREIGN PATENT DOCUMENTS

| | | | |
|---|---|---|---|
| WO | 2011085326 | * | 7/2011 |
| WO | 2011085326 | A9 | 7/2011 |
| WO | 2011109119 | A1 | 9/2011 |

OTHER PUBLICATIONS

International Search Report for PCT/US12/052417 dated Nov. 2, 2012.
Written Opinion of the International Searching Authority for PCT/US12/052417 dated Nov. 2, 2012.
Caparros et al. "Effect of D-Amino Acids on Structure and Synthesis of Peptidoglycan in *Escherichia coli*," Journal of Bacteriology (Sep. 1992), vol. 174, No. 17, pp. 5549-5559.
Cava et al. "Emerging knowledge of regulatory roles of D-amino acids in bacteria," Cell. Mol. Life Sci. (2011), vol. 68, pp. 817-831.
Hochbaum et al. "Inhibitory Effects of D-Amino Acids on *Staphylococcus aureus* Biofilm Development," Journal of Bacteriology (Oct. 2011), vol. 193, No. 20, pp. 5616-5622.
Kolodkin-Gal et al. "D-Amino Acids Trigger Biofilm Disassembly," Science (Apr. 30, 2010), vol. 328, pp. 627-629; and supporting online material (23 pages).
Lam et al. "D-Amino Acids Govern Stationary Phase Cell Wall Remodeling in Bacteria," Science (Sep. 18, 2009), vol. 325, pp. 1552-1555.
Lou, K.-J. "Triggering Biofilm Breakdown," SciBX (May 13, 2010), vol. 3, No. 19, 2 pages.
Xu, D. et al. "D-amino acids for the enhancement of a binary biocide cocktail consisting of THPS and EDDS against an SRB biofilm," World J Microbiol Biotechnol (2012) vol. 28, pp. 1641-1646.
Xu, D. et al. "A synergistic D-tyrosine and tetrakis hydroxymethyl phosphonium sulfate biocide combination for the mitigation of an SRB biofilm," World J Microbiol Biotechnol (published online Jun. 27, 2012), vol. 28, Issue 10, pp. 3067-3074.
Xu, H. et al. "D-Amino acid mitigated membrane biofouling and promoted biofilm detachment," J. Membrane Sci. (2011), vol. 376, pp. 266-274.

* cited by examiner

*Primary Examiner* — Charles Boyer
(74) *Attorney, Agent, or Firm* — Calfee, Halter & Griswold LLP

(57) ABSTRACT

Compositions and methods for treating biofilm formation and growth on a substrate are provided. The composition comprises 1 ppb to 1,000 ppm of at least one D-amino acid and 1 ppm to 60,000 ppm of at least one biocide. The method comprises contacting the substrate with 1 ppb to 1,000 ppm of at least one D-amino acid and 1 ppm to 60,000 ppm of at least one biocide. The compositions and methods are effective for preventing, reducing or eliminating biofilm formation or biofilm growth or both, as well as eradicating established, recalcitrant biofilms, particularly biofilms comprising sulfate reducing bacteria that are known to cause microbiologically influenced corrosion, biofouling, or both.

19 Claims, 12 Drawing Sheets

COMPOSITIONS AND METHODS FOR TREATING BIOFILMS

CROSS REFERENCE TO RELATED APPLICATIONS

This application is the U.S. national stage entry of PCT/US2012/052417, with an international filing date of Aug. 26, 2012, which claims priority to and the benefit of U.S. Provisional Patent Application Ser. No. 61/527,941, filed on Aug. 26, 2011, the entire disclosures of which are fully incorporated herein by reference.

BACKGROUND

Microbiologically influenced corrosion (MIC) is a serious problem in the oil and gas industry, as well as other industries such as water utilities. Sulfate reducing bacteria (SRB) biofilms are often found to be the main cause for MIC pitting attacks. Pitting corrosion due to SRB has been found to be responsible for pipeline failures. MIC pitting was identified as the primary suspect for the 2006 Alaska oil pipeline leak. Acid producing bacteria and other microorganisms have also been found to contribute to MIC.

In addition, biofouling by microbes, especially microbes in the form of biofilms, is a major problem in many industries, such as oil and gas, water utilities, power plants (especially cooling systems, such as chilled water systems and cooling towers), and fresh-water and salt-water shipping. Microbes in biofilms are far more difficult to treat than planktonic cells of the same microbes. One particular type of biofouling is reservoir souring, which is often the result of biogenic $H_2S$ production by SRB. Current treatments for SRB are partially effective; however, SRB are very resilient because the sessile SRB in biofilms formed on rock and soil surfaces underground are very difficult to eradicate. In shale oil and gas production, biofouling by microbes can plug the rock and soil pores resulting in reduced flow of oil and gas. In addition, biofouling is particularly troublesome in membrane filtration processes. The biofilms form and grow on the membrane and reduce throughput and shorten the membrane life span. Moreover, biofouling is also a problem in common households such as in kitchens and bathrooms. In biofouling situations, the recalcitrance of the biofilm makes it far more difficult to treat than treating a system with only planktonic cells. Unfortunately, an overwhelming majority of microbes prefer to organize as a biofilm community.

Mechanical cleaning, including line pigging, and biocide treatment are common methods for mitigating the effects of biofilms. Tetrakis hydroxymethyl phosphonium sulfate (THPS), a non-oxidizing biocide, is widely used due to its broad-spectrum and excellent biodegradability. Such biocides are generally effective for treating planktonic cells. However, the sessile cells in a biofilm, whether it is corrosive or only causes fouling, are far more difficult to treat than planktonic cells because the biofilm provides good protection from antibacterial agents and other unfavorable environmental influences. In fact, the biocide dosage required to eradicate sessile cells in an established biofilm is often tenfold higher, or more, than the dosage needed to eradicate planktonic cells.

SUMMARY

Provided herein are compositions and methods for treating biofilm formation and growth on a substrate. The compositions and methods are effective for reducing or eliminating biofilm formation or biofilm growth or both, as well as eradicating established, recalcitrant biofilms. In certain embodiments, the biofilm comprises sulfate reducing bacteria, which are known to cause MIC, biofouling, or both.

In a first embodiment, a composition for treating biofilm formation and growth on a substrate is provided. The composition comprises 1 ppb to 1,000 ppm of at least one D-amino acid and 1 ppm to 60,000 ppm of at least one biocide.

In a second embodiment, a method for treating biofilm formation and growth on a substrate is provided. The method comprises contacting the substrate with 1 ppb to 1,000 ppm of at least one D-amino acid and 1 ppm to 60,000 ppm of at least one biocide.

BRIEF DESCRIPTION OF THE DRAWINGS

The accompanying drawings, which are incorporated in and constitute a part of this specification, illustrate some embodiments of the inventions, and together with the description, serve to explain principles of the inventions.

DETAILED DESCRIPTION

Figure 1:
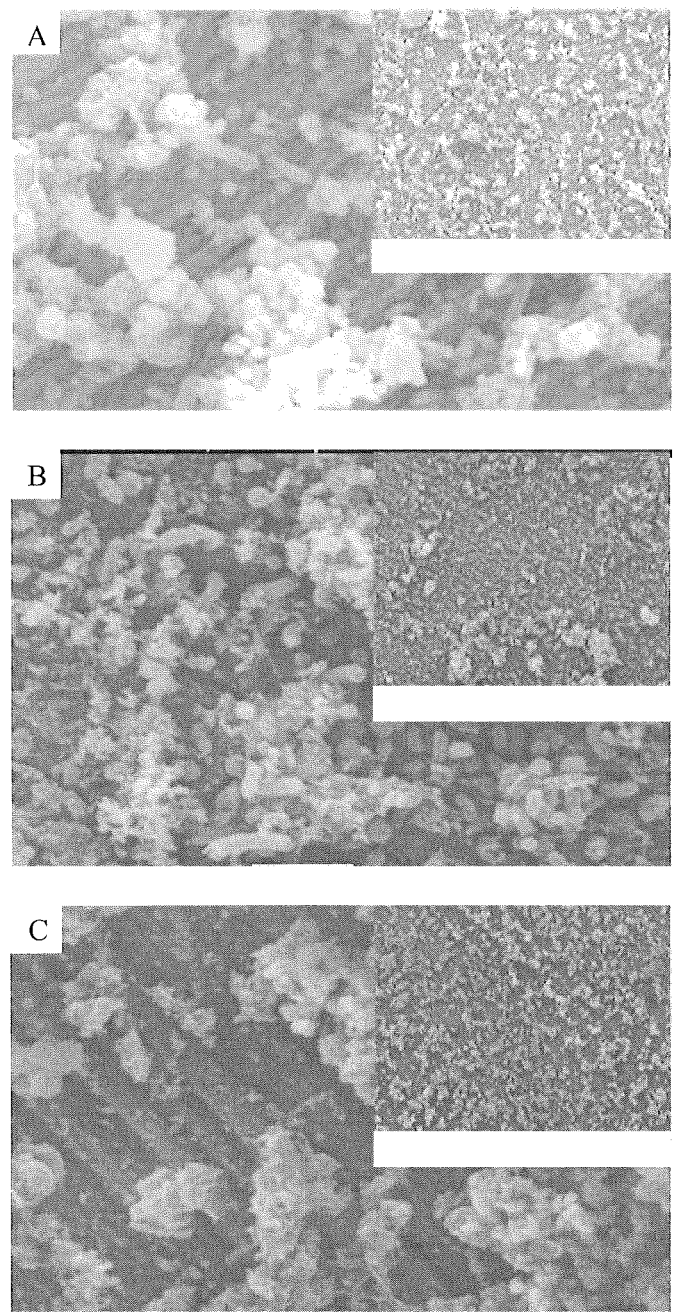
FIG. 1 shows SEM (Scanning Electron Microscope) images for 7-day coupons in *Desulfovibrio vulgaris* (ATCC 7757) (a common SRB strain) cultures with ATCC 1249 medium treated for 7 days with: (A) 100 ppm THPS; (B) 500 ppm D-methionine; and (C) 50 ppm THPS+100 ppm D-methionine. (Scale bars for the small inserted images are 50 μm.)

The presently disclosed compositions and methods for treating biofilm formation and growth on a substrate will now be described by reference to some more detailed embodiments, with occasional reference to the accompanying drawings. These compositions and methods may, however, be embodied in different forms and should not be construed as limited to the embodiments set forth herein. Rather, these embodiments are provided so that this disclosure will be thorough and complete, and will fully convey the scope of the compositions and methods to those skilled in the art.

Unless otherwise defined, all technical and scientific terms used herein have the same meaning as commonly understood by one of ordinary skill in the art to which these compositions and methods belong. The terminology used in the description of the compositions and methods herein is for describing particular embodiments only and is not intended to be limiting. As used in the specification and the appended claims, the singular forms "a," "an," and "the" are intended to include the plural forms as well, unless the context clearly indicates otherwise. All publications, patent applications, patents, and other references mentioned herein are incorporated by reference in their entirety.

Unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present compositions and methods. At the very least, and not as an attempt to limit the application of the doctrine of equivalents to the scope of the claims, each numerical parameter should be construed in light of the number of significant digits and ordinary rounding approaches.

Notwithstanding that the numerical ranges and parameters setting forth the broad scope of the compositions and methods are approximations, the numerical values set forth in the specific examples are reported as precisely as possible. Any numerical value, however, inherently contains certain errors necessarily resulting from the standard deviation found in their respective testing measurements. Every numerical range given throughout this specification will include every narrower numerical range that falls within such broader numerical range, as if such narrower numerical ranges were all expressly written herein.

The terms "microbiologically influenced corrosion" or "MIC" as used herein, unless otherwise specified, refer to processes in which any element of a system is structurally compromised due to the action of at least one member of a microbial population.

The term "partially coated" as used herein, unless otherwise specified, shall mean that any portion or all of the surface of a substrate is covered by a biofilm.

The term "substrate" as used herein refers to any type of surface on which cells can attach and a biofilm can form and grow. The substrate may be an "industrial" substrate such as an oil or gas piping system, or a "non-industrial" substrate such as a kitchen counter or a shower.

The term "biofilm(s)" as used herein, unless otherwise specified, refers to an aggregate of microorganisms in which cells adhere to adjacent cells, or to a surface of a substrate, or both. These adjacent cells are frequently embedded within a self-produced extracellular matrix of polymeric substances often composed of proteins and polysaccharides. Microbial cells in a biofilm are physiologically distinct from planktonic cells of the same organism, which by contrast are single cells that may swim or float through a fluid.

The terms "treat" or "treating" as used herein, unless otherwise specified, mean inhibit, mitigate, disinfect, damage, eliminate, reduce, eradicate, kill, prevent, remove, degrade, suppress, retard, or combinations thereof.

The terms "metal" and "metal alloy" as used herein, unless otherwise specified, refer to any elemental metal or alloy comprised of elemental metals (e.g., brass, bronze, and steel), respectively. Examples of metal and metal alloy products include, but are not limited to, pipes, infrastructure, beams, sheeting, prefabricated structures, underwater structures, holding vessels (e.g., water towers, storage tanks, etc.), military installations and structures, and military equipment (e.g., submarines and ships).

The term "aqueous solution" as used herein, unless otherwise specified, refers to a solution in which the solvent is water, including, but not limited to, water containing salts, such as magnesium sulfate ($MgSO_4$), sodium citrate, calcium sulfate ($CaSO_4$), ammonium chloride ($NH_4Cl$), dipotassium phosphate ($K_2HPO_4$), sodium lactate ($NaC_3H_5O_3$), and ammonium iron(II) sulfate $Fe(NH_4)_2(SO_4)_2$; ocean or seawater; brackish water; sources of freshwater, including lakes, rivers, stream, bogs, ponds, marshes, runoff from the thawing of snow or ice; springs, groundwater, and aquifers; and precipitation.

The term "oil" as used herein, unless otherwise specified, refers to any substance that is a liquid at ambient temperature and is hydrophobic but soluble in organic solvents, including, but not limited to, hexanes, benzene, toluene, chloroform, and diethyl ether. Classes of compounds included within the context of the above definition include vegetable oils, petrochemical oils (e.g., crude and refined petrochemical products), volatile essential oils (i.e., aroma compounds from plants), and oil/water mixtures.

The term "fuel" as used herein, unless otherwise specified, refers to any substance that stores energy, including fossil fuels, gasoline, mixtures of hydrocarbons, jet and rocket fuels, biofuels, and fuel/water mixtures.

The term "microbes" as used herein, unless otherwise specified, shall mean any and all microorganisms capable of colonizing, causing microbiologically influenced corrosion, or both, either directly or indirectly. Examples of microbes that generally colonize and cause damage to pipelines in the gas and oil industries include, but are not limited to, *Enterobacter* and *Citrobacter* bacteria (e.g., *E. dissolvens, E. ludwigii, C. farmeri* and *C. amalonaticus*); *Eubacterium* and *Clostridium* bacteria (e.g., *Clostridium butyricum, Clostridium algidixylanolyticum, Anaeorfilum pentosovorans, Bacteroides* sp., *Acinobacter* sp., *Propionibacterium* sp.); sulfate reducing bacteria including, but not limited to, *Desulfovibrionales* (e.g., *Desulfovibrio desulfuricans, Desulfovibrio vulgaris, Desulfovibrio aminophilus*); nitrate reducing bacteria; nitrite reducing bacteria; *Desulfobacterales*, and *Syntrophobacterales*; thiosulfate reducing anaerobes (e.g., *Geotoga aestuarianis, Halanaerobium congolense, Sulfurospirillum* sp.); tetracholoroethene degrading anaerobes (e.g., *Sporomusa ovata*); triethanolamine degrading bacteria (e.g., *Acetobacterium* sp.); denitrifiers (e.g., *Acidovorax* sp., *Pseudomonas* sp.); xylan degrading bacteria; *Nitrospirae; Halomonas* spp.; *Idiomarina* spp.; *Marinobacter aquaeolei; Thalassospira* sp.; *Silicibacter* sp.; *Chromohalobacter* sp.; Bacilli (e.g., *Bacillus* spp., *Exiguobacterium* spp.); *Comamonas denitrificans; Methanobacteriales; Methanomicrobiales; Methanosarcinales*. Examples of microbes that generally colonize and cause damage to pipelines in other industries include, but are not limited to, *Staphylococcus aureus, Methicillin*-resistant *Staphylococcus aureus* ("MRSA"), *Escherichia coli, Enterococcus fecalis, Pseudomonas aeruginosa, Aspergillus, Candida, Clostridium difficile, Staphylococcus epidermidis*, and *Acinobacter* sp.

The term "biocide" as used herein, unless otherwise specified, refers to any chemical agent or microorganism that can kill, suppress, retard, deter, render harmless, or exert a controlling effect on any harmful microbes by chemical or biological means.

The term "D-amino acid" as used herein, unless otherwise specified, refers to any and all dextrarotatory amino acids including, but not limited to, the enantiomers of the 19 naturally occurring L-amino acids; including D-arginine, D-histidine, D-lysine, D-aspartic acid, D-glutamic acid, D-serine, D-threonine, D-asparagine, D-glutamine, D-cysteine, D-proline, D-alanine, D-valine, D-leucine, D-isoleucine, D-methionine, D-phenylalanine, D-tyrosine, and D-tryptophan.

The term "cocktail" as used herein, unless otherwise specified, refers to a combination of at least one D-amino acid and at least one biocide.

In a first embodiment of the present disclosure, a composition for treating biofilm formation and growth on a substrate is provided. The composition comprises 1 ppb to 1,000 ppm of at least one D-amino acid and 1 ppm to 60,000 ppm of at least one biocide. The composition is effective for reducing or eliminating biofilm formation or biofilm growth or both, as well as eradicating established, recalcitrant biofilms, such as biofilms comprising sulfate reducing bacteria (SRB). As previously mentioned, biofilms comprising SRB are known to cause MIC, biofouling, or both.

In a second embodiment of the present disclosure, a method for treating biofilm formation and growth on a substrate is provided. The method comprises contacting the substrate with 1 ppb to 1,000 ppm of at least one D-amino acid and 1 ppm to 60,000 ppm of at least one biocide. The method may be implemented in a variety of ways and is effective for reducing or preventing biofilm formation or biofilm growth or both, as well as eradicating established, recalcitrant biofilms, such as biofilms comprising SRB that may lead to MIC, biofouling, or both.

As used throughout the description, unless clear from the context or otherwise specified, the units of ppm (parts per million) and ppb (parts per billion) are based on mass (w/w). For example, a 1 ppm biocide solution would have 1 mg of biocide per 1 kg of solution.

As will be demonstrated in the Examples that follow, treating a biofilm with a combination of at least one D-amino acid and at least one biocide exhibits an unexpected, synergistic effect. All bacterial cell walls (not including cell walls of archaea such as methanogens, or eukaryotes such as fungi) contain peptidoglycan, which contains one or more D-amino acids, such as D-alanine Without wishing to be bound by any particular theory, it is believed that the D-amino acids utilized in the presently disclosed compositions and methods replace the D-alanine in the peptidoglycan, which causes the biofilm to send a dispersal signal. This dispersal signal causes the biofilm to disassemble and the microbial cells in the biofilm revert to planktonic form. When the microbial cells are in planktonic form they are more responsive to biocide treatment than sessile cells. However, the data generated using the *D. vulgaris* biofilm indicates that the dispersal signaling is not effective unless there is an additional biocide stress on the biofilm. This is because the *D. vulgaris* biofilm is relatively recalcitrant. In addition, D-amino acids cannot target the cell walls of archaea and eukaryotes because these organisms do not contain peptidoglycan. However, a combination of at least one D-amino acid and at least one biocide is still useful for treating field biofilm consortia that contain these organisms because bacteria cells are likely present in the biofilm consortia. The at least one D-amino acid can target the bacterial cells in the biofilm, which will weaken the integrity of the biofilm, thus making the at least one biocide more effective.

In certain embodiments of the composition and method, the at least one D-amino acid is selected from the group consisting of D-tyrosine, D-methionine, D-tryptophan, D-leucine, D-arginine, D-histidine, D-lysine, D-aspartic acid, D-glutamic acid, D-serine, D-threonine, D-asparagine, D-glutamine, D-cysteine, D-proline, D-alanine, D-valine, D-isoleucine, D-phenylalanine, a non-standard D-amino acid, and combinations thereof. As noted above, the at least one D-amino acid is present at 1 ppb to 1,000 ppm, including 10 ppb to 900 ppm, including 100 ppb to 500 ppm, including 1 ppm to 100 ppm, and also including 30 ppm to 70 ppm.

In certain embodiments of the composition and method, the at least one D-amino acid is a mixture of two, three, four, or more D-amino acids. In one embodiment, the at least one D-amino acid is a D-amino acid mixture of D-tyrosine, D-methionine, D-tryptophan, and D-leucine. For example, in certain embodiments, the at least one D-amino acid is a 6.6 ppb to 6.6 ppm D-amino acid mixture with equimolar amounts of D-tyrosine, D-methionine, D-tryptophan, and D-leucine (6.6 ppb corresponds to a concentration of 10 nM for each D-amino acid in the mixture and 6.6 ppm corresponds to a concentration of 10 mM for each D-amino acid in the mixture). In certain other embodiments, the at least one D-amino acid is a 6.6 ppb to 100 ppm D-amino acid mixture with equimolar amounts of D-tyrosine, D-methionine, D-tryptophan, and D-leucine, In yet certain other embodiments of the compositions and methods of the present disclosure, the at least one D-amino acid is a 100 ppb to 100 ppm D-amino acid mixture comprising D-tyrosine, D-methionine, D-tryptophan, and D-leucine. In certain other embodiments of the compositions and methods utilizing a D-amino acid mixture, the D-amino acids are provided in equimolar amounts.

In certain other embodiments of the composition and method, the at least one D-amino acid is D-tyrosine. For example, in certain embodiments of the composition and method, the at least one D-amino acid is 100 ppb to 100 ppm D-tyrosine, including 1 ppm to 90 ppm D-tyrosine, including 20 ppm to 80 ppm D-tyrosine, and also including 30 ppm to 60 ppm D-tyrosine. In yet other embodiments of the composition and method, the at least one D-amino acid is D-methionine. For instance, in one exemplary embodiment of the composition and method, the at least one D-amino acid is 100 ppb to 100 ppm D-methionine, including 1 ppm to 90 ppm D-methionine, including 20 ppm to 80 ppm D-methionine, and also including 30 ppm to 60 ppm D-methionine.

In other embodiments of the compositions and methods, the at least one D-amino acid is a non-standard amino acid. For example, in certain embodiments of the compositions and methods, the non-standard D-amino acid is selected from the group consisting of carnitine, gamma-aminobutyric acid (GABA), beta-amino acids, gamma-amino acids, hypusine, selenocysteine, lanthionine, 2-aminoisobutyric acid, dehydroalanine, dehydrophenylalanine, phosphotyrosine, ornithine, citrulline, 3-aminopropionic acid, panthothenic acid, taurine, pyrrolysine, 5-hydroxytryptophan (5-HTP), dihydroxyphenylalanine (DOPA), and combinations thereof. Other non-standard D-amino acids known to those of skill in the art may be used in the first and second embodiments disclosed herein.

As mentioned above, the compositions and methods disclosed herein utilize the discovery of the synergistic effect between at least one D-amino acid and at least one biocide for treating biofilms. The at least one biocide may be any of a variety of agents that exhibit biocidal or antimicrobial properties. For example, in certain embodiments of the compositions and methods disclosed herein, the at least one biocide is selected from the group consisting of tetrakis hydroxymethyl phosphonium sulfate (THPS), glutaraldehyde, chlorine monoxide, chlorine dioxide, calcium hypochlorite, potassium hypochlorite, sodium hypochlorite, dibromonitrilopropionamide (DBNPA), methylene bis(thiocyanate) (MBT), 2-(thiocyanomethylthio)benzothiazole (TCMTB), bronopol, 2-bromo-2-nitro-1,3-propanediol (BNPD), tributyl tetradecyl phosphonium chloride (TTPC), taurinamide and derivatives thereof, phenols, quaternary ammonium salts, chlorine-containing agents, quinaldinium salts, lactones, organic dyes, thiosemicarbazones, quinones, carbamates, urea, salicylamide, carbanilide, guanide, amidines, imidazolines, acetic acid, benzoic acid, sorbic acid, propionic acid, boric acid, dehydroacetic acid, sulfurous acid, vanillic acid, p-hydroxybenzoate esters, isopropanol, propylene glycol, benzyl alcohol, chlorobutanol, phenylethyl alcohol, formaldehyde, iodine and solutions thereof, povidone-iodine, hexamethylenetetramine, noxythiolin, 1-(3-chloroallyl)-3,5,7-triazo-1-azoniaadamantane chloride, taurolidine, taurultam, N-(5-nitro-2-furfurylidene)-1-amino-hydantoin, 5-nitro-2-furaldehyde semicarbazone, 3,4,4'-trichlorocarbanilide, 3,4', 5-tribromosalicylanilide, 3-trifluoromethyl-4,4'-dichlorocarbanilide, 8-hydroxyquinoline, 1-cyclopropyl-6-fluoro-1,4-dihydro-4-oxo-7-(1-piperazinyl)-3-quinolinecarboxylic acid, 1,4-dihydro-1-ethyl-6-fluoro-4-oxo-7-(1-piperazinyl)-3-quinolinecarboxylic acid, hydrogen peroxide, peracetic acid, sodium oxychlorosene, parachlorometaxylenol, 2,4,4'-trichloro-2'-hydroxydiphenol, thymol, chlorhexidine, benzalkonium chloride, cetylpyridinium chloride, silver sulfadiazine, silver nitrate, bromine, ozone, isothiazolones, polyoxyethylene (dimethylimino) ethylene (dimethylimino) ethylene dichloride, 2-(tert-butylamino)-4-chloro-6-ethylamino-S-triazine (terbuthylazine), and combinations thereof.

In certain embodiments of the compositions and methods of the present disclosure, the at least one biocide is tetrakis hydroxymethyl phosphonium sulfate (THPS). For example, in an exemplary embodiment of the composition and method, the at least one biocide is 1 ppm to 10,000 ppm THPS. In certain other embodiments of the compositions and methods, the at least one biocide is 5 ppm to 5,000 ppm THPS, including 10 ppm to 1,000 ppm THPS, including 20 ppm to 500 ppm THPS, including 25 ppm to 100 ppm THPS, and also including 30 ppm to 50 ppm THPS.

In certain other embodiments of the compositions and methods of the present disclosure, the at least one biocide is a chlorine based biocide, including, but not limited to, chlorine monoxide, chlorine dioxide, sodium hypochlorite, calcium hypochlorite, and potassium hypochlorite. For example, in an exemplary embodiment of the composition and method, the at least one biocide is 100 ppm to 60,000 ppm sodium hypochlorite. In certain other embodiments of the compositions and methods, the at least one biocide is 500 ppm to 60,000 ppm sodium hypochlorite, including 1,000 ppm to 60,000 ppm sodium hypochlorite, including 5,000 ppm to 60,000 ppm sodium hypochlorite, including 10,000 ppm to 60,000 ppm sodium hypochlorite, and also including 30,000 ppm to 60,000 ppm sodium hypochlorite.

In other embodiments according to the first and second embodiments of the compositions and methods disclosed herein, additional chemical additives including, but not limited to, dispersants, surfactants, and combinations thereof may be useful in enhancing the efficacy of the combination of the at least one D-amino acid and the at least one biocide. An exemplary surfactant for use in the compositions and methods according to the present disclosure is sodium dodecyl sulfate (SDS), also known as sodium lauryl sulfate. In certain embodiments of the compositions and methods, 100 ppm to 1,000 ppm SDS is utilized in combination with the at least one D-amino acid and the at least one biocide, including 200 ppm to 800 ppm SDS, including 400 ppm to 600 ppm SDS, and also including 500 ppm SDS. Additional surfactants for use in certain embodiments of the compositions and methods according to the present disclosure include, but are not limited to, sodium octyl sulphate, sodium decyl sulphate, sodium hexadecyl sulphate, odecyl benzene sulfonate, di dodecyl benzyl tri ethyl ammonium chloride, cetyl pyridinium chloride, alkyl trimethyl ammonium bromide, cetyl trimethyl ammonium bromide, n-dodecylpyridinium bromide, N,N,N-dimethyl 4-methylbenzyl dodecyl ammonium chloride, ammonium dodecyl sulfate, 1,1(lauryl amido)propyl ammonium chloride, N,N-di(polyoxyethylene)amino lauryl amide, alkanediyl-α,ω-bis-(dimethylalkyl ammonium bromide), 1,2-ethane bis-(dimethyl tetradecyl ammonium bromide), hexadecyltrimethylammonium bromide, dodecyl trimethyl ammonium bromide, tetradecyl trimethyl ammonium bromide, polyethylene glycol p-(1,1,3,3-tetramethylbutyl)-phenyl ether, gelatin, dodecylbenzene sulfonate (DBS), N-dodecanoyl-N-methylglycine, N-dodecanoyl-N-methyltaurine, or combinations thereof. Although only a few examples of additional chemical additives have been expressly disclosed, other additives with similar properties may be utilized with the compositions and methods described herein.

As previously mentioned, and according to the second embodiment of the present disclosure, a method for treating biofilm formation and growth on a substrate comprises contacting the substrate with 1 ppb to 1,000 ppm of at least one D-amino acid and 1 ppm to 60,000 ppm of at least one biocide. In certain embodiments, the substrate is selected from the group consisting of a pipe, a holding vessel, a wellbore, a ship hull, infrastructure, a beam, a trough, a girder, sheeting, prefabricated structures, underwater structures, underground rock formations, and underground soil formations. In certain other embodiments, the substrate is formed of a material selected from the group consisting of a metal, a metal alloy, nylon, composite material, wood, plastic, glass, ceramic, porcelain, painted surfaces, rock, soil, and combinations thereof. In an exemplary embodiment, the substrate is a pipe, for example, one or more pipes utilized for transporting oil, natural gas, water, fuel, etc. that may be prone to developing a biofilm. Although several examples of substrates have been expressly discussed, those of skill in the art will appreciate that the compositions and methods according to the present disclosure can be utilized on any substrate that may be prone to developing a biofilm.

The methods according to the present disclosure may be implemented in a variety of ways. For example, in certain embodiments of the method, the at least one D-amino acid and the at least one biocide are separately and simultaneously added to a medium that contacts, or wets, the substrate. In certain other embodiments, the at least one D-amino acid and the at least one biocide are separately and sequentially added to a medium that contacts, or wets, the substrate. In still other embodiments, the at least one D-amino acid and the at least one biocide are in a single solution that is added to a medium that contacts, or wets, the substrate. In the various embodiments of the method, the at least one D-amino acid and the at least one biocide may be added to the medium by one or more pumps, a gravity feed system, or even directly poured into the medium. Those with skill in the art will appreciate that other means for adding the at least one D-amino acid and the at least one biocide to the medium are available and may be utilized with the presently disclosed methods.

In certain embodiments of the presently disclosed methods, the medium may be virtually any medium know to facilitate the formation and growth of a biofilm. For example, in certain embodiments, the medium is selected from the group consisting of an oil, an aqueous solution, a hydraulic fracturing fluid, a fuel, carbon dioxide, a natural gas, an oil/water mixture, a fuel/water mixture, or combinations. In certain other embodiments, the medium is selected from the group consisting of solutions in which the solvent is water, water containing salts, ocean or seawater, brackish water, sources of freshwater, lakes, rivers, stream, bogs, ponds, marshes, runoff from the thawing of snow or ice, springs, groundwater, aquifers, precipitation, any substance that is a liquid at ambient temperature and is hydrophobic but soluble in organic solvents, hexanes, benzene, toluene, chloroform, diethyl ether, related organic compounds, vegetable oils, petrochemical oils, crude oil, refined petrochemical products, volatile essential oils, any substance that stores energy, fossil fuels, gasoline, mixtures of hydrocarbons, jet and rocket fuels, biofuels, and combinations thereof. In an exemplary embodiment, the medium is an oil/water mixture.

In certain embodiments according to the first and second embodiment, the substrate is underground rock formations or underground soil formations and the medium is a hydraulic fracturing fluid. Hydraulic fracturing fluids are utilized in hydraulic fracturing processes for shale oil and gas production. Biofilms grow on and in the underground rock formations and underground soil formations and plug the rock and soil pores, which reduces the flow of oil and gas. The combination of 1 ppb to 1,000 ppm of at least one D-amino acid and 1 ppm to 60,000 ppm of at least one biocide is useful for treating biofouling caused by biofilms found in underground rock formations or underground soil formations in shale oil and gas production.

As briefly discussed above, the compositions and methods disclosed herein are effective for reducing or preventing biofilm formation or biofilm growth or both, as well as eradicating established, recalcitrant biofilms, such as biofilms comprising SRB that may lead to MIC, biofouling, or both. The efficacy is believed to be a result of the synergy between the at least one D-amino acid and the at least one biocide. As will be demonstrated in the Examples, treatments with high concentrations of only at least one D-amino acid were not as effective for treating biofilm formation or growth, or for eradicating established, recalcitrant biofilms, as the combination of at least one D-amino acid and at least one biocide. Similarly, treatments with high concentrations of only at least one biocide were not as effective for treating biofilm formation or growth, or for eradicating established, recalcitrant biofilms, as the combination of at least one D-amino acid and at least one biocide. Moreover, the combination of at least one D-amino acid and at least one biocide allows for a reduced dosage of the at least one biocide required for achieving effective biofilm treatment results. Thus, the presently disclosed compositions and methods provide capital savings by reducing the amount of biocide required to treat biofilms, as well as reduce environmental exposure of the biocide.

EXAMPLES

The following examples illustrate certain embodiments or features of compositions and methods according to the first and second embodiments disclosed herein. The examples are given solely for the purpose of illustration and are not to be construed as limitations of the present disclosure, as many variations thereof are possible without departing from the spirit and scope of the disclosure.

Example 1

Example 1 illustrates certain embodiments of compositions and methods for treating biofilms according to the present disclosure.

Materials and Methods

Bacterium, Culture Media and Chemicals

*D. vulgaris* (ATCC 7757), a laboratory SRB strain, was cultured in ATCC 1249 medium. Quarter strength medium with only four key ingredients, i.e., $MgSO_4$, sodium lactate, $Fe(NH_4)_2(SO_4)_2$ and yeast extract at concentrations ¼ of those in the full ATCC 1249 medium was also used to simulate a less nutritious environment. D-methionine and THPS were obtained from Sigma-Aldrich, St. Louis, Mo., USA. A stock solution of 10,000 ppm THPS was adjusted to neutral pH just before use because the unadjusted solution was quite acidic and it could cause corrosion by itself. The recommended pH for THPS applications is between 6 and 8. It is not uncommon to adjust THPS solution pH to near neutral pH. SRB culture media were sterilized in an autoclave and then deoxygenated using $N_2$ (filter sterilized) sparging. SRB cells were enumerated using an SRB test kit (Sani-Check® Product #100, Biosan Laboratories, Warren, Mich., USA). For a highly effective biocide system, the residual SRB cell count is much lower than the $5\times10^4$ cells/ml detection limit for direct counting under a microscope at 400× magnification needed to view the very small *D. vulgaris* cells that are motile. Below this cell count, it is hard to catch an individual cell under the light microscope. The Most Probable Number (MPN) enumeration method is a standard method to estimate very low cell counts. MPN succeeds by growing the cells first and correlating the cell counts with the appearance of black color (due to FeS produced by SRB). This is far more sensitive and reliable than SRB colony counting using plate cultures that do not work for very low cell counts. The SRB test kit used in this example is equivalent to an MPN method using a solid medium instead of a liquid medium.

Substratum for Biofilm Growth

Anaerobic vials used in this example were 125 ml (Catalog No. 223748, Wheaton Industries Inc., 143 Millville, N.J., USA), each filled with 100 ml of culture medium. A glovebox filled with filter-sterilized $N_2$ provided an anaerobic environment. To mitigate any possible oxygen leaks, 100 ppm L-cysteine (Fisher Scientific, Pittsburgh, Pa., USA), an oxygen scavenger, was added to the culture media. Thin disk shaped C1018 carbon steel coupons with a top disk surface area of 1.12 $cm^2$ were polished with 200, 400, and 600 grit abrasive papers progressively. Only the top surface of each coupon was exposed to the culture medium. The rest of the surfaces were coated with inert Teflon. After polishing, the coupons were weighed. The coupons were cleaned using isopropanol and then dried under UV light for 15 minutes.

Prevention of Biofilm Establishment

Three duplicate coupons and 1 ml of a 3-day old SRB seed culture were added to each anaerobic vial. The initial SRB cell concentration in each vial immediately after inoculation was approximately $10^6$ cells/ml. After adding treatment chemical(s) following inoculation, the vials were sealed and then incubated at 37° C. After 7 days of incubation, the biofilm on a coupon surface was observed under SEM. The procedure to prepare a coupon for SEM observation of a biofilm was described by Wen et al., *Inter. Biodeter. Biodegr.*, (2009), 63:1102-1106. Au coating of the biofilm covered coupon was necessary for SEM because the biofilm was not conductive. An SEM image was taken for the spot with most sessile cells after screening three duplicate coupons. A special control coupon was inserted in a vial containing the culture medium without biocide treatment and incubated without inoculation. This abiotic control would indicate yellow rust if an oxygen leak occurred. Its surface was also scanned for sessile cells under SEM for possible microbial contamination. Care was also taken to identify sessile cells that looked different from *D. vulgaris* during biofilm observation under SEM, which would indicate microbial contamination.

To obtain the average sessile cell density on a coupon surface, the sessile cells were first scraped off from the surface of a duplicate coupon onto a brush-like dipstick of the SRB test kit handled with sterile tweezers. The dipstick was wetted with deoxygenated water before scraping. Most of the sessile cells were collected by the dipstick. The coupon was then placed in a test tube with 1 ml deoxygenated water and sonicated for 30 seconds in an ultrasonic bath to dislodge any residual sessile cells on the coupon surface. The dipstick was put into the test tube that still had the coupon in it and the test tube was vortexed for 30 seconds to disperse the cells into the liquid. The dipstick was retrieved using the tweezers and inserted into the SRB test kit vial containing a solid culture medium. The time required for a black color to appear corresponded to a certain minimum SRB concentration based on vendor's specifications. A fifteen or thirty second burst of sonication is a common technique used to remove biofilm cells from a solid surface without harming the cells and the method is used to enhance the biofilm quantification when combined with vortexing.

Removal of an Established Biofilm

Coupons covered with biofilms were first obtained from 7-day old SRB cultures in the anaerobic vials. The coupons were taken out and rinsed with deoxygenated distilled water to remove planktonic cells. Three coupons covered with biofilms were placed in each new vial containing fresh ATCC 1249 medium and treatment chemical(s). The vials were sealed and then incubated at 37° C. The coupons were taken out 7 days after incubation and analyzed using the procedures described above. The tests were also repeated by treating the coupons covered with biofilms with biocide solutions free of nutrients for three hours to simulate short-term treatment.

Mitigation of MIC Pitting

The coupons for SEM used in above in "Prevention of Biofilm Establishment" were reused to observe the MIC pitting after their biofilms and Au coating were removed using the Clark's solution. Coupon weight loss data were obtained from another duplicate coupon in each vial. The coupon surface was cleaned to remove biofilms and mineral deposits using the Clark's solution before weighing. The metal weight loss due to the cleaning was found to be less than 0.02 mg for a coupon with an exposed surface area of 1.12 $cm^2$, which was negligible for weight loss calculations in this example.

Results and Discussion

Table 1 shows that 30 ppm THPS had no effect on the sessile cell count on the coupon surface, while 100 ppm D-methionine resulted in a sessile cell count of $10^5$ cells/$cm^2$ compared with $10^6$ cells/$cm^2$ without treatment. When treated with 30 ppm THPS+100 ppm D-methionine, 50 ppm THPS, 50 ppm THPS+10 ppm D-methionine, respectively, the sessile cell count was $10^4$ cells/$cm^2$. Table 1 also indicates that 10 ppm D-methionine did not enhance 50 ppm THPS noticeably because both resulted in the same sessile cell count of $10^4$ cells/$cm^2$. However, when 50 ppm D-methionine was combined with 50 ppm THPS, the sessile cell count dropped to $10^3$ cells/$cm^2$. Further increasing the D-methionine concentration to 100 ppm resulted in an undetectable sessile cell count. This means that the cocktail comprising 50 ppm THPS and 100 ppm D-methionine was far more efficacious than 100 ppm THPS alone because the latter resulted in a sessile cell count of $10^2$ cells/$cm^2$. The binary biocide cocktail reduced the sessile cell count from more than $10^6$ cells/$cm^2$ (without treatment, i.e., control) to below 10 cells/$cm^2$, reflecting a 5-log reduction.

TABLE 1

Sessile cell counts after 7 days using different treatment methods for inhibiting SRB biofilm establishment.*

| Treatment | Sessile cell count (cells/$cm^2$) |
|---|---|
| No treatment | $\geq 10^6$ |
| 30 ppm THPS | $\geq 10^6$ |
| 100 ppm D-methionine | $\geq 10^5$ |
| 30 ppm THPS + 100 ppm D-methionine | $\geq 10^4$ |
| 50 ppm THPS | $\geq 10^4$ |
| 50 ppm THPS + 10 ppm D-methionine | $\geq 10^4$ |
| 50 ppm THPS + 50 ppm D-methionine | $\geq 10^3$ |
| 100 ppm THPS | $\geq 10^2$ |
| 50 ppm THPS + 100 ppm D-methionine | $\leq 10$ |

*The test was repeated three times.

The SEM images in FIG. 1 confirmed the key results in Table 1. It shows that coupons treated with 100 ppm THPS alone (FIG. 1A), 500 ppm D-methionine alone (FIG. 1B) had sessile SRB cells on their surfaces. However, when the coupon was treated with a combination of 50 ppm THPS plus 100 ppm D-methionine, the sessile cells were hard to find (FIG. 1C), indicating successful prevention of SRB biofilm establishment on the coupon surface with the binary biocide cocktail treatment.

Removal of Established SRB Biofilm

Figure 2:
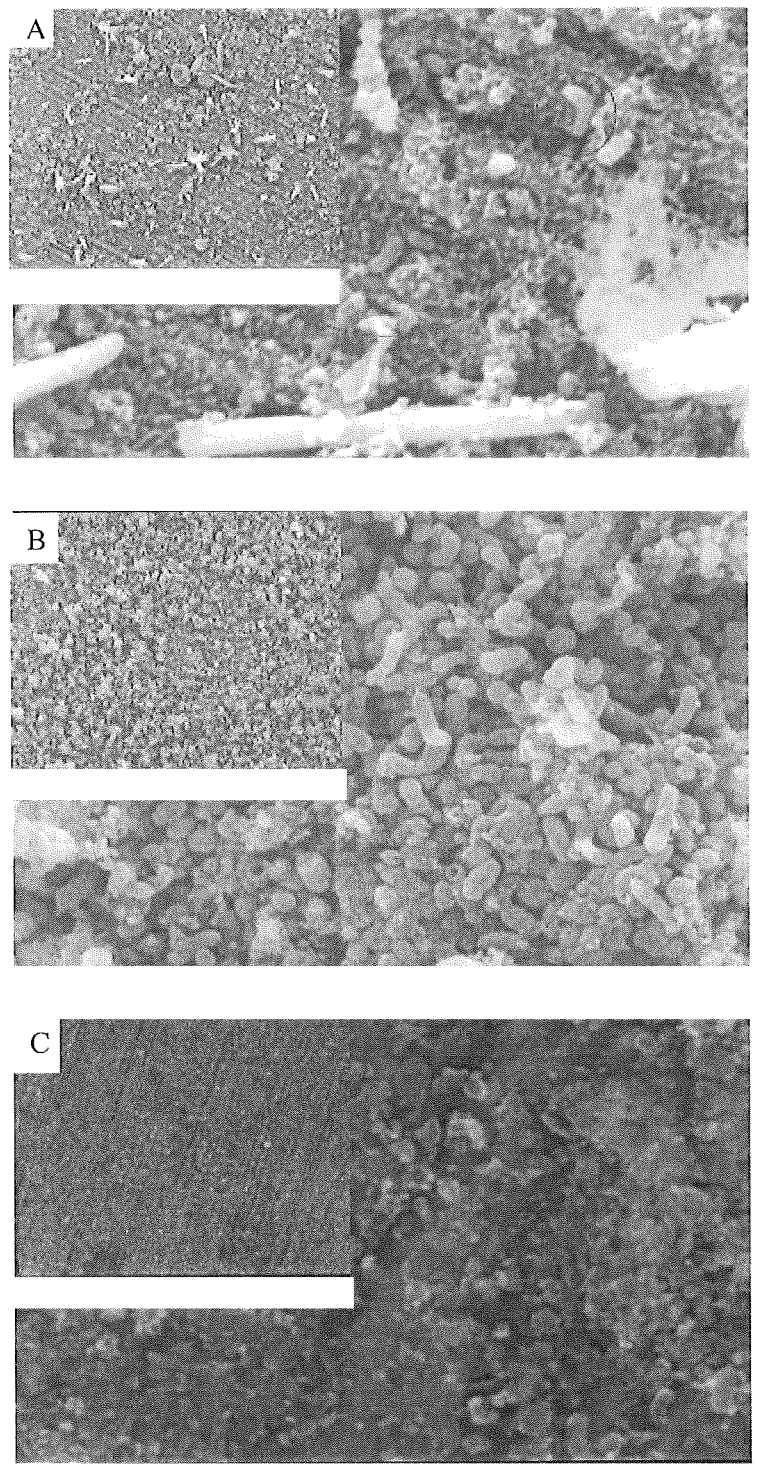
FIG. 2 shows SEM images for coupons in ATCC 1249 medium covered with established biofilms before they were treated for 3 days with: (A) 500 ppm THPS; (B) 1,000 ppm D-methionine; and (C) 50 ppm THPS+100 ppm D-methionine. (Scale bars for the small inset images are 50 μm. Circle indicates SRB sessile cell location.)

When a biofilm is already established, it is usually far more difficult to remove than preventing biofilm establishment using a biocide. FIG. 2A shows that after being treated with 500 ppm THPS for 7 days, some sessile cells were still present on the coupon surface. When 1,000 ppm D-methionine alone was used for treatment, sessile SRB cells were abundant on the coupon surface (FIG. 2B), indicating no inhibition of the sessile cells in the biofilm. However, when treated with the binary biocide cocktail comprising 50 ppm THPS and 100 ppm D-methionine, no sessile cells were noticeable on the coupon surface (FIG. 2C), indicating that the established biofilm was successfully removed. This result shows that the synergistic binary biocide cocktail was far more superior in biofilm removal than its individual components even at much higher concentrations. A comparison of FIG. 2A with FIG. 2C indicates that the binary biocide cocktail comprising 50 ppm THPS and 100 ppm D-methionine was more effective at removing the biofilm than 500 ppm THPS.

Figure 3:
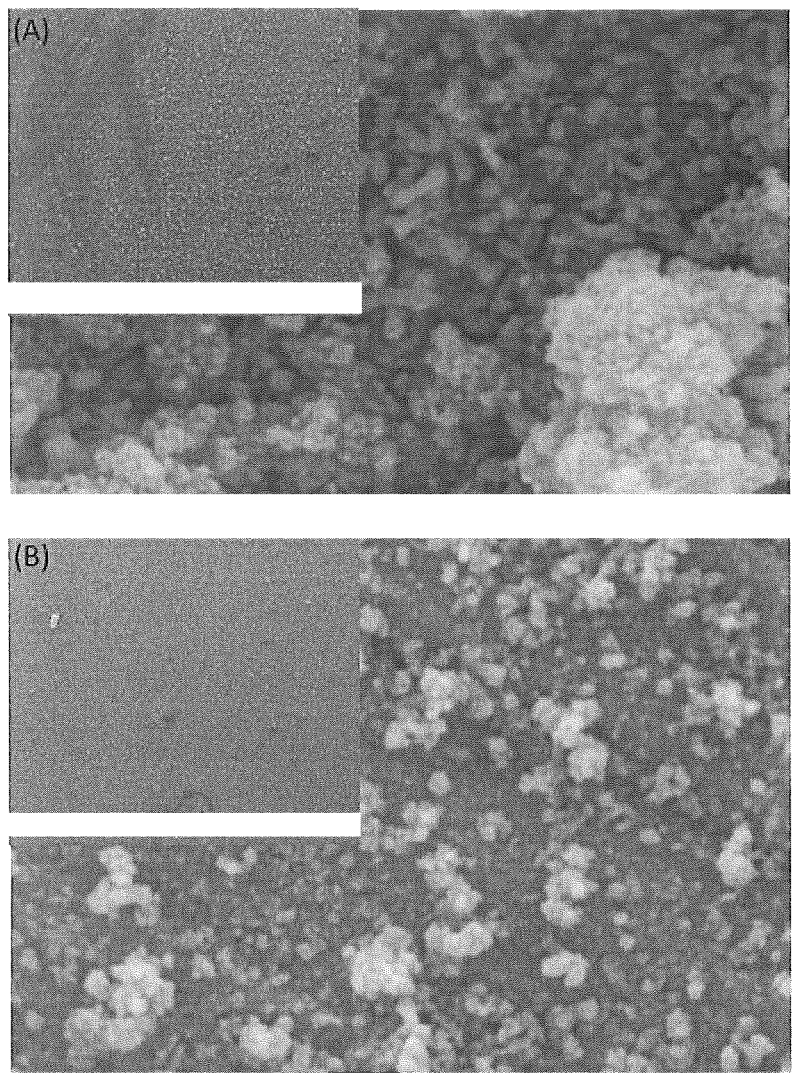
FIG. 3 shows SEM images for coupons covered with established biofilms before they were treated in ¼ strength ATCC 1249 medium with: (A) 50 ppm THPS; and (B) 50 ppm THPS+100 ppm D-methionine. (Scale bars for the small inset images are 500 μm.)

To simulate a less nutritious environment for established SRB biofilms, the biofilm removal tests were also conducted in the ¼ strength culture medium during biocide treatment. The coupons covered with biofilms before treatment were obtained in the same way as previously described for the full strength medium. Despite the fact that the ¼ strength medium was used, 50 ppm THPS alone was still inadequate because numerous sessile SRB cells can be seen in FIG. 3A. However, when the 50 ppm THPS+100 ppm D-methionine biocide cocktail was used, the biofilm was removed (FIG. 3B).

Figure 4:
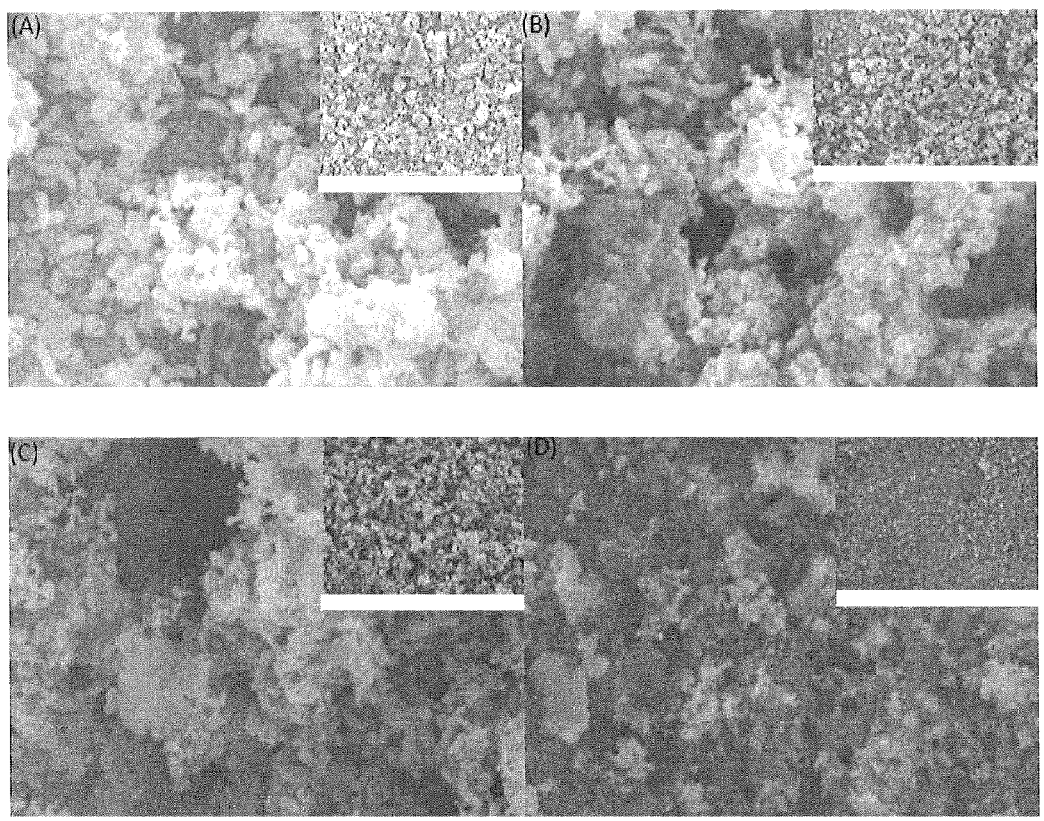
FIG. 4 shows SEM images for coupons (initially covered with established biofilms) after undergoing 3-h shock treatment with: (A) deoxygenated water; (B) 50 ppm THPS; (C) 500 ppm D-methionine treatment; and (D) 50 ppm THPS+100 ppm D-methionine. (Scale bars for the small inset images are 50 μm.)

In some field applications, the local medium is removed and a biocide solution is used to treat established biofilms in a nutrient-free environment. This process, which is a form of "shock treatment," is referred to as "slug treatment" if it is applied to a pipeline. In this example, the above tests were repeated by soaking coupons covered with biofilms in medium-free biocide solutions for three hours before the coupons were removed for examination. FIG. 4 shows the results obtained by treating coupons in: (A) deoxygenated distilled water (control); (B) 50 ppm THPS; (C) 100 ppm D-methionine; and (D) 50 ppm THPS+100 ppm D-methionine, respectively. Again, the binary cocktail containing 50 ppm THPS+100 ppm D-methionine was far more effective than 50 ppm THPS alone and 100 ppm D-methionine alone.

Probe of Possible D-Methionine Biofilm Removal Mechanism

Figure 5:
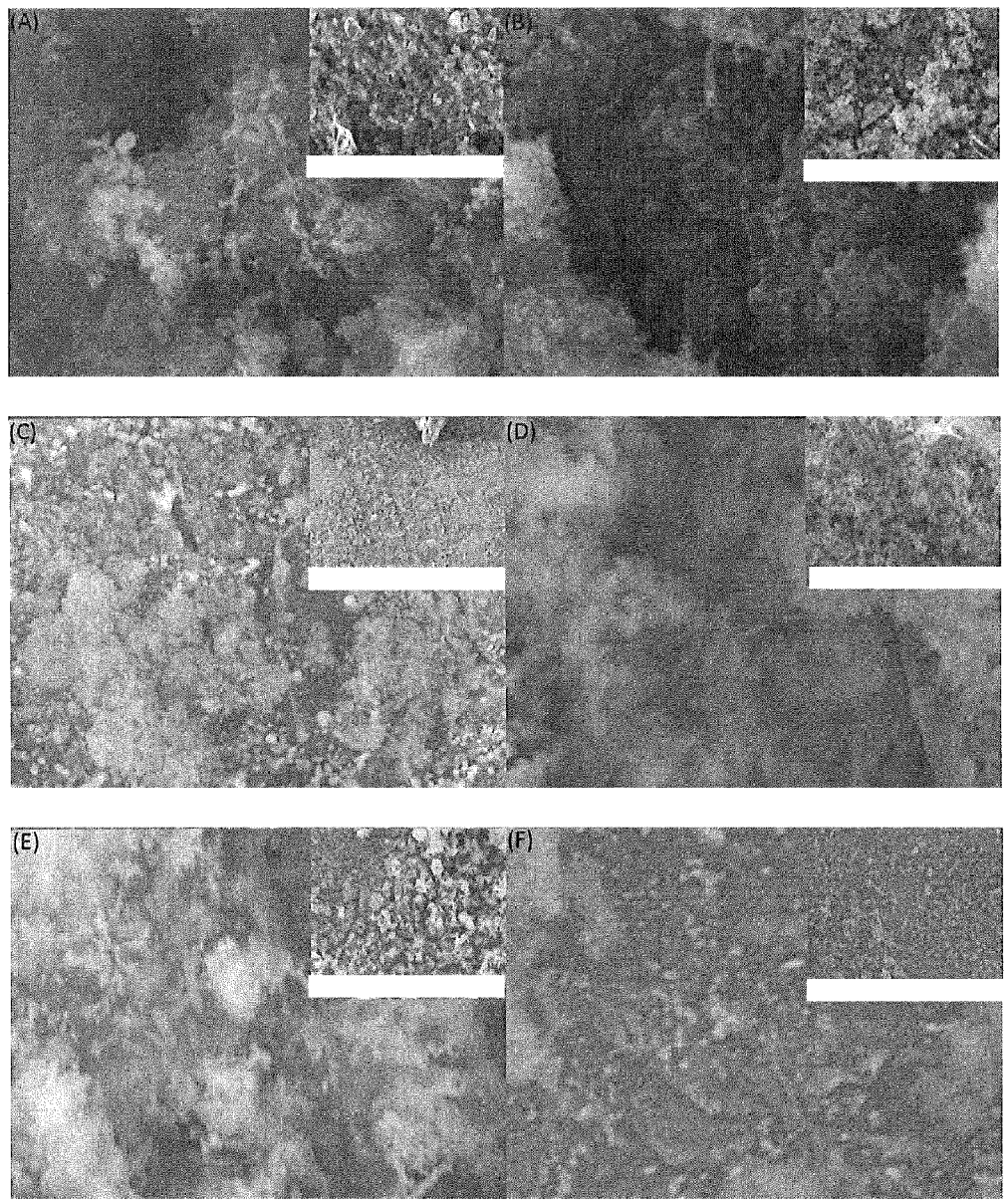
FIG. 5 shows SEM images for coupons (initially covered with established biofilms) after undergoing 3-h shock treatment with: (A) 50 ppm THPS; (B) 500 ppm D-methionine; (C) 50 ppm THPS+100 ppm D-methionine; (D) 50 ppm THPS+100 ppm L-methionine; (E) 50 ppm THPS+100 ppm D-methionine+1,000 ppm D-alanine; and (F) 50 ppm THPS+100 ppm D-methionine+100 ppm L-methionine, respectively. (Scale bars for the small inset images are 50 μm.)

A separate set of 3-hour shock treatment tests was performed using different combinations of treatment chemicals including THPS, D-methionine, D-alanine and L-methionine. In these tests, MgSO$_4$ and (NH$_4$)$_2$Fe(SO$_4$)$_2$ were added to the treatment chemicals at ¼ of their corresponding concentrations in the full ATCC 1249 medium to reduce possible adverse osmotic effect on cells during medium switching. FIG. 5C confirms that the binary cocktail containing 50 ppm THPS+100 ppm D-methionine was far more effective than 50 ppm THPS alone (FIG. 5A) and 500 ppm D-methionine alone (FIG. 5B). FIG. 5D shows that 50 ppm THPS+100 ppm L-methionine (instead of D-methionine) did not significantly enhance the 50 ppm THPS treatment when compared with FIG. 5A. This suggests that L-methionine was not a biocide enhancer. FIG. 5E indicates that the addition of 1,000 ppm D-alanine inhibited the efficacy of the binary biocide cocktail comprising 50 ppm THPS+100 ppm D-methionine. This was likely because the high concentration of D-alanine in the solution suppressed the ability of D-methionine to replace the D-alanine in the cell wall's peptidoglycan molecules.

FIG. 5F shows that the presence of L-methionine did not interfere with the efficacy of the binary cocktail comprising 50 ppm THPS+100 ppm D-methionine. This means that a D/L-methionine mixture manufactured from chemical synthesis may be used instead of the more expensive D-methionine to cut costs.

Mitigation of MIC Pitting

Figure 6:
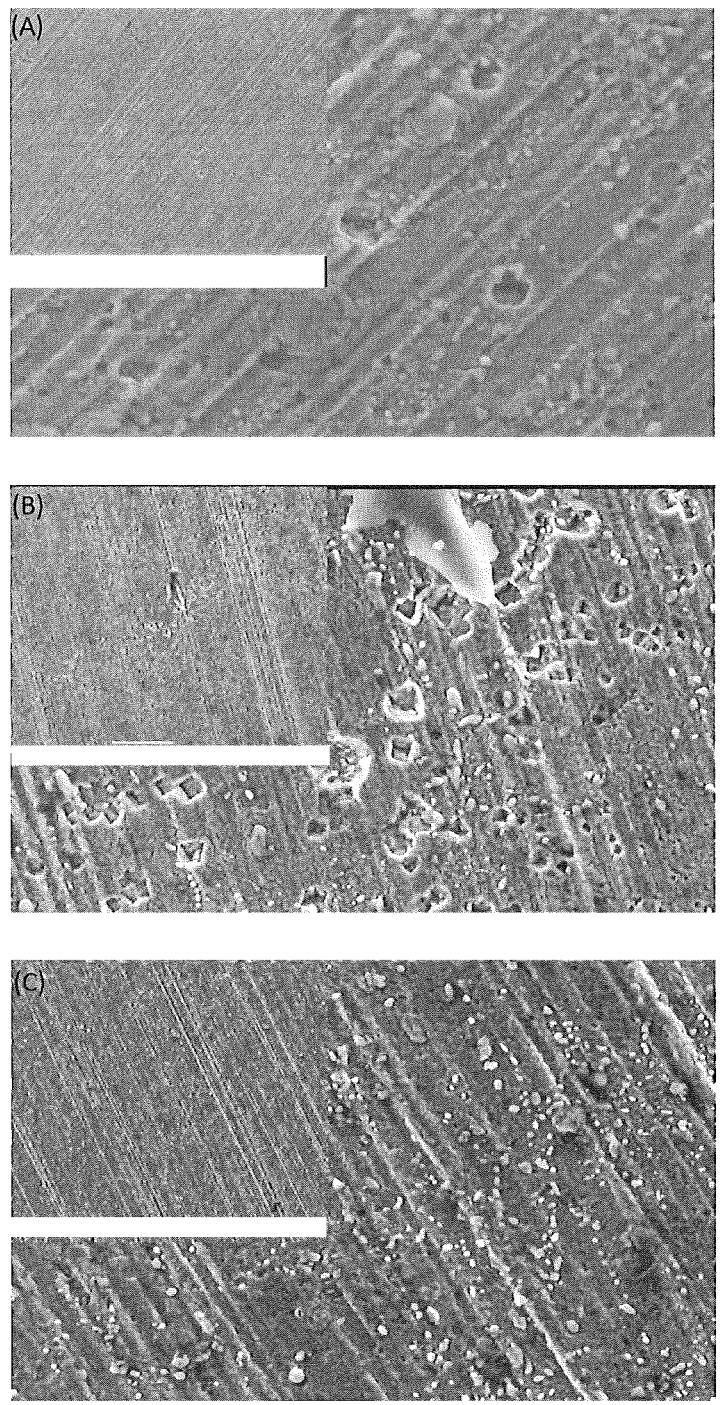
FIG. 6 shows SEM images of coupon surfaces after biofilm removal. Coupons were obtained from ATCC 1249 medium 7 days after treatment with: (A) 50 ppm THPS; (B) 500 ppm D-methionine; and (C) 50 ppm THPS+100 ppm D-methionine. (Scale bars for the small inset images are 50 μm.)
Figure 7:
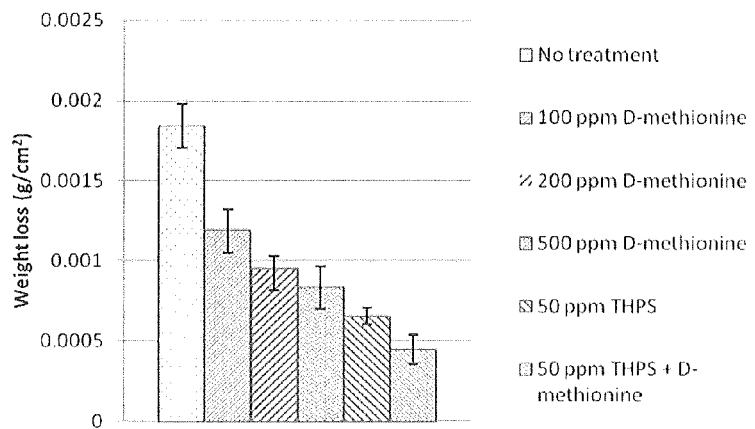
FIG. 7 graphically represents weight loss data for different treatment methods in the mitigation of MIC pitting of carbon stell coupons.

FIG. 6 shows a comparison of the effects of different treatment methods in the mitigation of MIC pitting. The same coupons used in FIG. 1 were re-examined after biofilm and Au coating removal. Under SEM, the area with the largest pits was located and shown in FIG. 6. FIGS. 6A and 6B indicate that 50 ppm THPS alone and 500 ppm D-methionine alone did not prevent MIC pitting because pits with a horizontal dimension of up to 4 μm were present. This is consistent with the biofilm results in FIGS. 1A and 1B showing sessile SRB cells on the coupon surfaces. When the biocide cocktail comprising 50 ppm THPS and 100 ppm D-methionine was used, no large pits were present (FIG. 6C). The efficacy of the biocide cocktail was further confirmed by the normalized weight loss data presented in FIG. 7. It shows that the cocktail treatment of 50 ppm THPS and 100 ppm D-methionine yielded the smallest weight loss of 0.45 mg/cm$^2$ compared with the other treatment methods and the control coupon without any chemical treatment. Compared with the average of 0.65 mg/cm$^2$ weight loss in the treatment with 50 ppm THPS alone, the binary combination of 50 ppm THPS+100 ppm D-methionine led to a smaller average weight loss of 0.45 mg/cm$^2$.

Table 2 shows that 100 ppm D-methionine alone did not exhibit any measureable impact on the planktonic SRB cell count while it was able to reduce the sessile cell count to $10^5$ cells/cm$^2$ compared to the control ($10^6$ cells/cm$^2$) (Table 1). Table 2 also shows that 50 ppm THPS was quite effective in reducing the planktonic SRB cell count to $10^2$ cells/ml compared with $10^8$ cells/ml without treatment. However, adding 100 ppm D-methionine to the 50 ppm THPS biocide solution did not enhance planktonic SRB eradication over the 50 ppm THPS treatment (Table 2). This suggested that D-methionine is not biocidal.

TABLE 2

Planktonic cell counts after 7 days using different treatment methods for the prevention of SRB biofilm establishment.*

| Treatment | Planktonic cell count (cells/ml) |
| --- | --- |
| No treatment | ≥$10^8$ |
| 100 ppm D-methionine | ≥$10^8$ |
| 50 ppm THPS | ≥$10^2$ |
| 50 ppm THPS + 100 ppm D-methionine | ≥$10^2$ |

*Initial D. vulgaris cell concentration was $10^6$ cells/ml and the test was repeated three times.

Efficacies of Other D-Amino Acids

Figure 8:
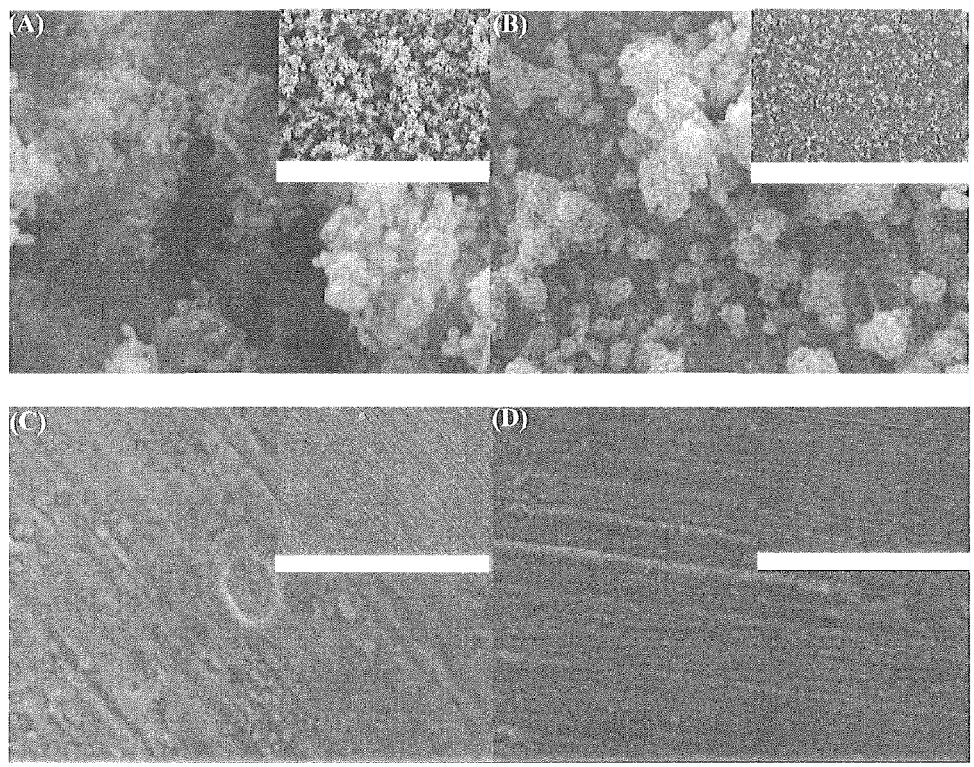
FIG. 8 shows SEM images for 7-day coupons in SRB cultures with ATCC 1249 medium treated with: (A) 10 ppm D-tyrosine; and (B) 50 ppm THPS+10 ppm D-tyrosine in biofilm prevention tests. (C) shows pitting images with same treatment as in (A), and (D) shows pitting images with same treatment as in (B). (Scale bars for the small inset images are 50 μm.)
Figure 9:
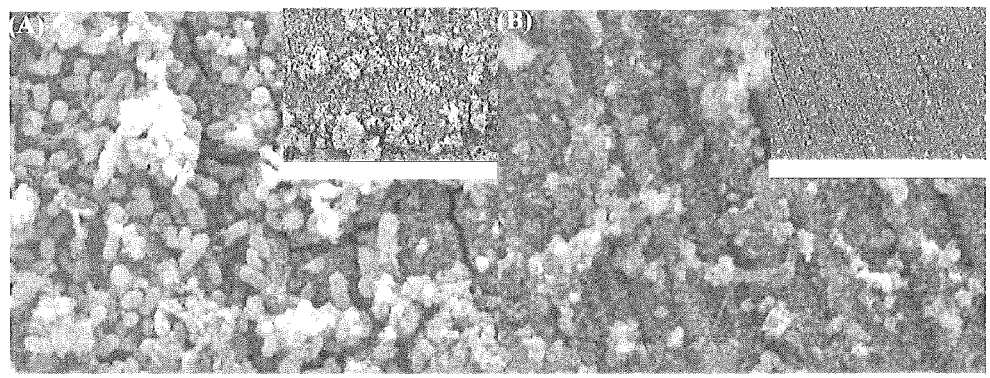
FIG. 9 shows SEM images for coupons (initially covered with pre-established SRB biofilms) in ATCC 1249 medium 7 days after being treated with: (A) 100 ppm D-tyrosine; and (B) 50 ppm THPS+10 ppm D-tyrosine. (Scale bars for the small inset images are 50 μm.)
Figure 10:
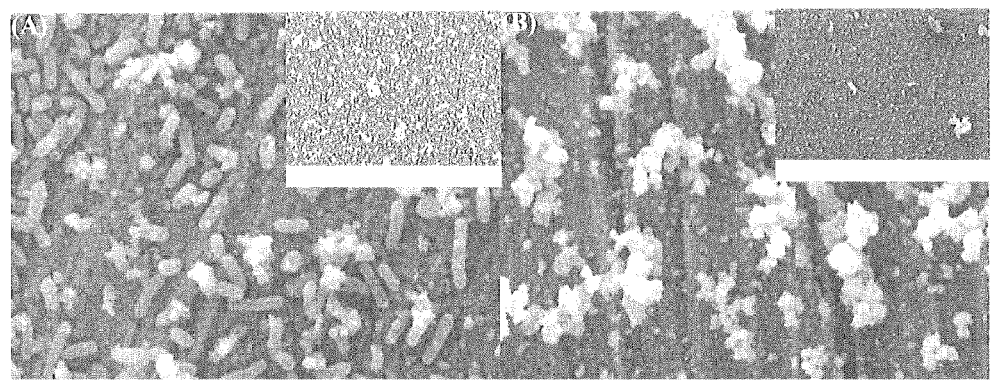
FIG. 10 shows SEM images for 7-day coupons in SRB cultures with ATCC 1249 medium treated with: (A) 100 ppm D-tryptophan; and (B) 50 ppm THPS+100 ppm D-tryptophan. (Scale bars for the small inset images are 50 μm.)

FIG. 8 shows that a biocide cocktail comprising 50 ppm THPS+10 ppm D-tyrosine was effective in preventing SRB biofilm formation (FIG. 8B) and MIC pitting (FIG. 8D), while 10 ppm D-tyrosine alone was not effective in preventing SRB biofilm formation (FIG. 8A) or MIC pitting (FIG. 8C). The cocktail comprising 50 ppm THPS+10 ppm D-tyrosine was also effective in removing an established SRB biofilm as shown in FIG. 9. FIG. 10 shows that 100 ppm D-tryptophan was ineffective while a biocide cocktail comprising 50 ppm THPS+100 ppm D-tryptophan was effective in preventing SRB biofilm formation on a coupon surface. Similarly, sessile cell count data in Table 3 indicates that a biocide cocktail containing 50 ppm THPS+100 ppm D-leucine was effective in preventing biofilm formation.

TABLE 3

Sessile cell counts after 7 days using different treatment methods for the prevention of SRB biofilm establishment on a coupon surface

| Treatment | Sessile cell count (cells/cm$^2$) |
|---|---|
| No treatment | $\geq 10^6$ |
| 500 ppm D-leucine | $\geq 10^5$ |
| 50 ppm THPS | $\geq 10^3$ |
| 50 ppm THPS + 50 ppm D-leucine | $\geq 10^3$ |
| 50 ppm THPS + 100 ppm D-leucine | $\leq 10$ |
| 50 ppm THPS + 500 ppm D-leucine | $\leq 10$ |

Figure 11:
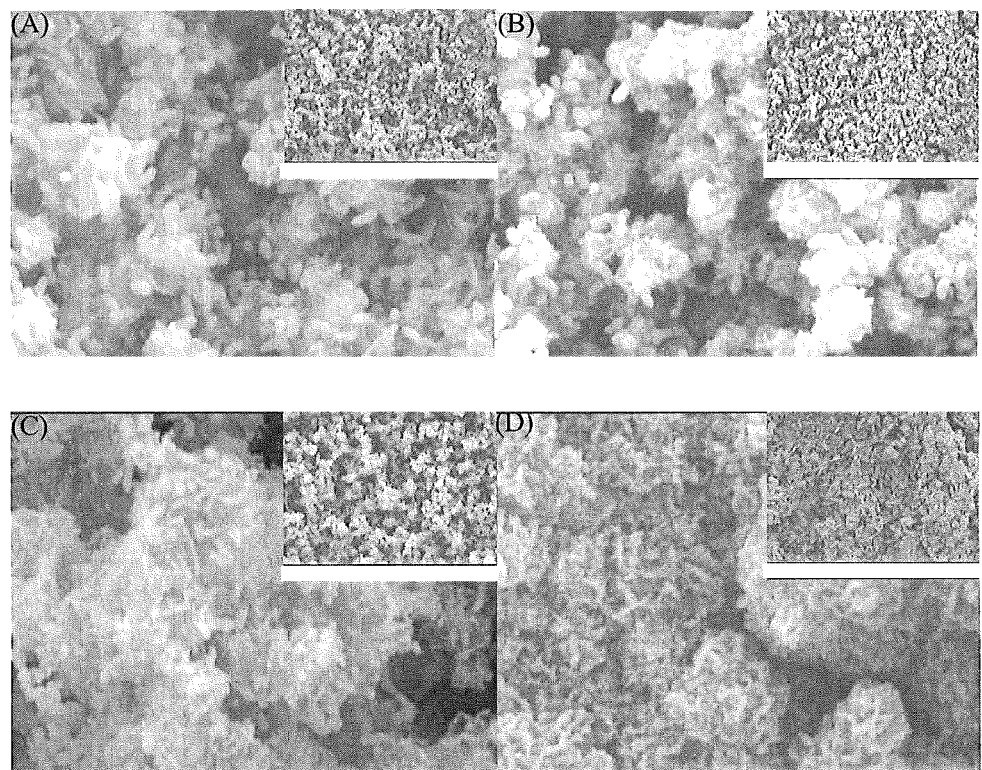
FIG. 11 shows SEM images for coupons (initially covered with pre-established SRB biofilms) in ATCC 1249 medium 7 days after being treated with: (A) control (no treatment chemicals added to the culture medium); (B) 30 ppm THPS; (C) 30 ppm THPS+500 ppm sodium dodecyl sulfate (SDS); and (D) 30 ppm THPS+500 ppm SDS+6.6 ppm D-amino acid mixture, respectively. (Scale bars for the small inset images are 50 μm. The D-amino acid mixture contained equimolar D-tyrosine, D-leucine, D-tryptophan and D-methionine.)

Lower D-amino acid concentrations are needed if more than one D-amino acid is present. Furthermore, a surfactant such as sodium lauryl sulfate (also known as sodium dodecyl sulfate or SDS) may also improve the efficacy. FIG. 11 indicates that a biocide cocktail comprising 30 ppm THPS+500 ppm SDS+6.6 ppm D-amino acid mixture with equimolar D-tyrosine, D-leucine, D-tryptophan and D-methionine (FIG. 11D) was effective in removing an established biofilm on a coupon surface while 30 ppm THPS (FIG. 11B), and 30 ppm THPS+500 SDS (FIG. 11C) were both found ineffective.

Example 2

Example 2 illustrates certain embodiments of compositions and methods for treating biofilms according to the present disclosure.

Materials and Methods

Bacterium and Nutrient Medium

*D. vulgaris* (ATCC 7757), a common SRB strain, was used in this example. Before inoculation, the culture media were autoclave sterilized and then sparged with filter-sterilized nitrogen for at least 45 minutes to remove dissolved oxygen. SRB growth was carried out in 125 ml anaerobic vials (Catalog No. 223748, Wheaton Industries Inc., Millville, N.J., USA) filled with 100 ml culture medium. In the test, 1 ml SRB seed culture was used to inoculate each anaerobic vial to achieve an SRB concentration of $10^6$ cells/ml right after inoculation. The full-strength ATCC 1249 medium with 200 ppm $Fe^{2+}$ was used to grow SRB biofilm on coupon surfaces.

Chemicals and Biofilm Growth Substratum

D-tyrosine and THPS were purchased from Sigma-Aldrich (St. Louis, Mo., USA). In order to avoid acidity due to THPS addition to the culture medium, a 10,000 ppm stock THPS solution was prepared. It was neutralized to pH 7.0 by adding a sodium hydroxide solution. Coin shaped C1018 carbon steel coupons with a top exposed surface area of 1.12 cm$^2$ were used as substratum for SRB growth. The side and bottom surfaces were coated with inert Teflon. The top surface was polished sequentially by 200, 400, and 600 grit abrasive papers. Nitrogen sparging was used to remove dissolved oxygen in all liquids and to provide an anaerobic environment in a glove box. 100 ppm L-cysteine (Fisher Scientific, Pittsburgh, Pa., USA) was added to the culture media as an oxygen scavenger to mitigate any possible oxygen leak.

Prevention of SRB Biofilm Establishment

To test the prevention of biofilm establishment on coupon surfaces, three coupons were added to each vial together with 100 ml full-strength medium, THPS, and D-tyrosine. One milliliter of SRB seed culture was added at the beginning of the tests and the vials were sealed and incubated at 37° C. without shaking. After 7 days, the coupons were taken out and examined for sessile SRB cells.

Removal of Established SRB Biofilm

The full-strength ATCC 1249 medium was used to grow SRB biofilms on coupon surfaces first. After 3 days of incubation at 37° C., coupons were covered with mature SRB biofilms. In the anaerobic chamber, the coupons were taken out and rinsed with phosphate buffered saline (PBS) buffer to remove loose planktonic cells. The coupons were then placed into petri dishes containing treatment chemicals in a water solution. Some coupons were treated for 1 h and some for 3 h. This simulated slug treatment with a contact time lasting 1 and 3 h, respectively, as in the situation when a biocide slug flows inside a pipeline. Flow effect was not considered here. Exposing SRB cells on a coupon from the ATCC 1249 medium to a water solution lacking salt ions might cause osmotic shock that could interfere with the biocide efficacy evaluation. Instead of using PBS buffer commonly used in cell cultures, two salts in the original medium, $MgSO_4$ and $(NH_4)_2Fe(SO_4)_2$, were added to the 1 and 3-h treatment solutions at ¼ of their corresponding concentrations in the full-strength ATCC 1249 medium. The treated coupons were then removed and examined for sessile SRB cells. The diluted medium was used here to simulate the residual nutrients retained by the local biofilms when the bulk pipeline or tank fluid is displaced by the biocide solution during a field treatment.

SEM for Biofilm Observation

The procedure to prepare a coupon for SEM observation of a biofilm on a coupon surface was described by Wen et al., *Inter. Biodeter. Biodegr.*, (2009), 63:1102-1106. The sessile cells were distributed rather unevenly on a coupon that had been treated with THPS and D-tyrosine. Thus, an SEM image was taken after searching for a spot with the most sessile cells. The cells seen in the SEM images should not be used to count the sessile cells because of uneven distribution. Instead, the Most Probable Number (MPN) method was used to enumerate sessile cells. SEM images could be used as qualitative visual confirmation of biofilm removal.

Enumeration of Sessile Cells

Viable *D. vulgaris* cells can be seen as motile cells under a light microscope at 400×. Thus they can be counted using a hemocytometer. However, this method has a detection limit of $5 \times 10^4$ cells/ml minimum at 400× magnification. It is a standard practice to enumerate very low cell counts using the semi-quantitative most probable number (MPN) method with a liquid culture medium or a solid medium. The accuracy of MPN is typically 1 log in cell numbers. Thus, it takes at least a 2-log reduction to assure the efficacy of a biocide system. In this example, the sessile cells on a coupon were scraped and collected in a test tube by using the brush-like dipstick that was part of an SRB test kit (Sani-Check® Product #100 from Biosan Laboratories, Warren, Mich., USA). The dipstick was then soaked in 10 ml sterilized distilled water and vortexed for 30 s. Finally, the dipstick was inserted into the test kit's vial containing a solid SRB culture medium. The SRB sessile cell concentration was based on how long it took for the black color (FeS) to appear in the medium around the dipstick. The tests were repeated three separate times. Each time, two coupons were used for sessile SRB cell counting.

Results and Discussion

Prevention of SRB Biofilm Establishment

Table 4 shows that there were more than $10^7$ SRB cells/cm$^2$ on the coupon surface after 7 days for an untreated coupon (control), while 100 ppm THPS alone achieved a 5-log (i.e., $10^5$) reduction or 99.999% kill of SRB sessile cells. This means that 100 ppm THPS did not completely prevent SRB biofilm establishment because $10^2$ SRB cells/$cm^2$ remained. One hundred ppm D-tyrosine alone achieved only a 1-log reduction, allowing $10^6$ SRB cells/$cm^2$ to stay on the coupon surface, indicating that D-tyrosine had very limited ability to disperse sessile SRB cells when it was used in the absence of THPS. Fifty ppm THPS was also inadequate because $10^4$ SRB cells/$cm^2$ were found on the coupon surface. However, when a binary combination of 50 ppm THPS+1 ppm D-tyrosine was used, sessile SRB cells were undetectable. This indicates that a very strong synergy between THPS and D-tyrosine completely prevented the SRB biofilm establishment. It is highly desirable to achieve log reductions in cell counts as large as possible using a very effective biocide system. This is because in the field microbes bounce back and repeated treatments are often needed. A highly effective biocide system reduces the frequency of treatments by increasing the time gap between treatments.

Figure 12:
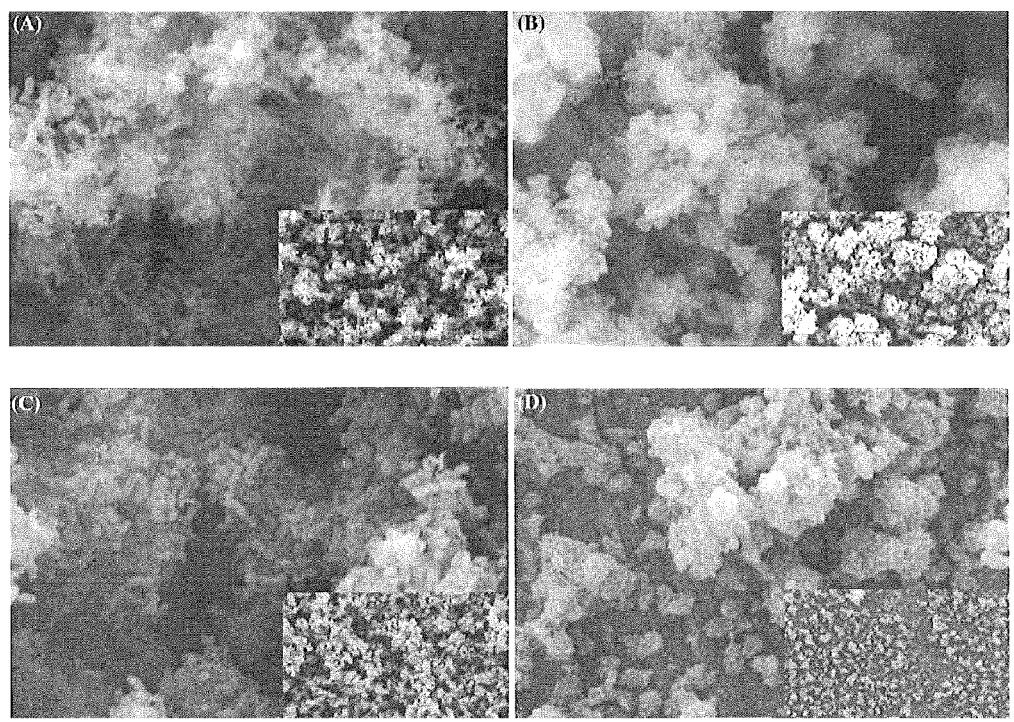
FIG. 12 shows SEM images for 7-day in SRB cultures in ATCC 1249 medium treated with: (A) control (no treatment chemicals added to the culture medium); (B) 100 ppm THPS; (C) 100 ppm D-tyrosine; and (D) 50 ppm THPS+1 ppm D-tyrosine, respectively. (Scale bars for the small inset images are 50 μm.)

The sessile cell count data in Table 4 are supported by the SEM observations of coupon surfaces. FIG. 12A shows the biofilm image on a coupon surface taken out from the 7-day old culture with the full strength medium containing no treatment chemicals. The SRB cells appear to be very abundant in FIG. 12A. FIG. 12B shows some SRB cells on the coupon that was treated with 100 ppm THPS in the full-strength medium for 7 days. This means that the treatment was partially effective. When a coupon was treated with 100 ppm D-tyrosine, sessile SRB cells were abundant (FIG. 12C) as the untreated control (FIG. 12A), indicating that D-tyrosine alone was completely ineffective. However, when a coupon was treated with a combination of 50 ppm THPS+1 ppm D-tyrosine, sessile SRB cells were not seen (FIG. 12D). In FIG. 12D, the bare coupon surface can be seen underneath the mineral deposits with parallel metal polishing lines at a roughly 135° angle. Based upon the figures, it was clear that the 50 ppm THPS+1 ppm D-tyrosine combination achieved a much cleaner coupon surface (FIG. 12D) compared to 100 THPS treatment (FIG. 12B). Thus, 1 ppm D-tyrosine was able to cut the THPS dosage in half while achieving a far better biofilm prevention result.

TABLE 4

Sessile cell counts on coupons taken from 7-day SRB cultures in 1249 medium mixed with different treatment chemicals for the prevention of SRB biofilm establishment.

| Treatment | Sessile cell count (cells/$cm^2$) |
| --- | --- |
| No treatment (control) | $\geq 10^7$ |
| 100 ppm D-tyrosine | $\geq 10^6$ |
| 50 ppm THPS | $\geq 10^4$ |
| 50 ppm THPS + 1 ppm D-tyrosine | <10 |
| 100 ppm THPS | $\geq 10^2$ |

Removal of Established SRB Biofilm

For the 1-h simulated slug treatment against an established SRB biofilm on a coupon surface, Table 5 shows that 100 ppm D-tyrosine alone is not effective because it only reduced the sessile SRB concentration from $10^6$ to $10^5$ cells/$cm^2$, while 50 ppm THPS was slightly more effective with a 2-log reduction. However, when the combination of 50 ppm THPS+1 ppm D-tyrosine was used, the $10^6$ cells/$cm^2$ SRB biofilm was completely eradicated showing undetectable SRB sessile cells (<10 cells/$cm^2$). The same outcome was achieved using 100 ppm THPS, meaning that 1 ppm D-tyrosine was able to decrease the THPS dosage by half. The 3-h simulated slug treatment data in Table 5 were the same as the 1-h data, except that 50 ppm THPS showed 1 log improvement in the reduction of sessile SRB cell count compared with 1-h data. The data suggested that with the binary cocktail treatment, 1 h was sufficient under the given test conditions.

Figure 13:
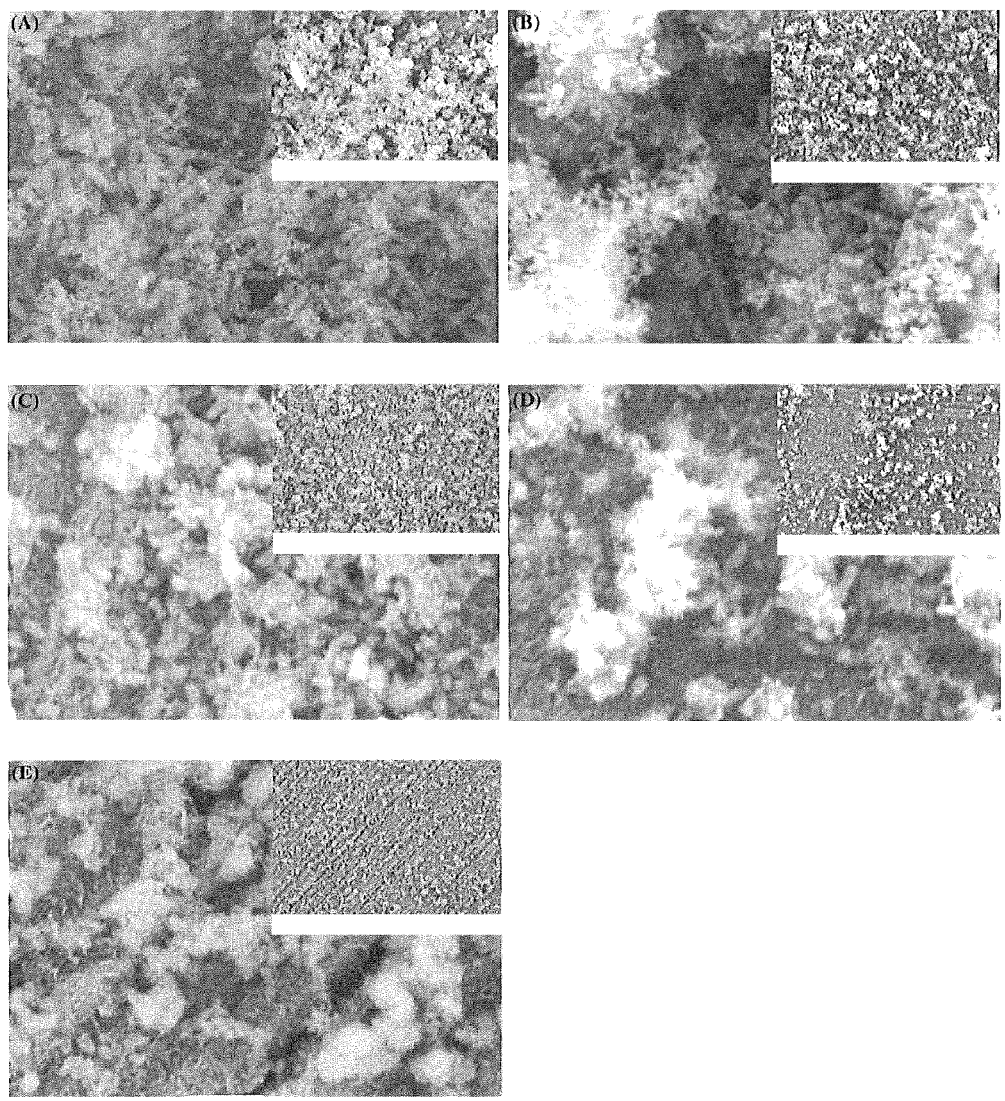
FIG. 13 shows SEM images for coupons (initially covered with mature SRB biofilms) after undergoing 1-h shock treatment with: (A) a solution containing $MgSO_4$ and $(NH_4)_2Fe(SO_4)_2$ at the same concentration as in the full strength culture medium (control); (B) 50 ppm TPHS; (C) 100 ppm D-tyrosine; (D) 30 ppm TPHS+1 ppm D-tyrosine; (E) 50 ppm TPHS+1 ppm D-tyrosine, respectively. (Scale bars for the small inset images are 50 μm.)

The SEM images of the biofilms on the coupon surfaces supported the 1-h shock treatment data in Table 5. FIG. 13A shows a control coupon that was treated in a solution containing $MgSO_4$ and $(NH_4)_2Fe(SO_4)_2$ at the same concentration as in the full strength culture medium for 1-h. The sessile SRB cells were abundant on the coupon surface. FIG. 13B shows that numerous sessile SRB cells remained on the surface of a coupon treated with 50 ppm THPS alone. Similarly, FIG. 13C shows that the treatment using 100 ppm D-tyrosine alone also left many sessile cells on the coupon surface. FIG. 13D shows that 30 ppm THPS+1 ppm D-tyrosine was partially effective in removing the biofilm because a few sessile could be seen. Sessile SRB cells were absent on the coupon treated with the combination of 50 ppm THPS+1 ppm D-tyrosine (FIG. 13E). In FIG. 13E (including the inset image), the bare coupon surface is partially visible with orderly parallel polishing lines at a roughly 45° angle. For other ineffective or partially effective treatment cases in FIG. 13, the polishing lines were not seen. FIG. 13D suggests that the minimum THPS dosage in this example should be about 30 ppm if a complete SRB biofilm eradication is desired.

TABLE 5

Sessile cell counts on coupons (initially covered with mature (i.e., established) SRB biofilms) after undergoing 1-h treatment and 3-h treatment, respectively.

| Treatment | Sessile cell count for 1-h treatment (cells/$cm^2$) | Sessile cell count for 3-h treatment (cells/$cm^2$) |
| --- | --- | --- |
| No treatment (control) | $\geq 10^6$ | $\geq 10^6$ |
| 100 ppm D-tyrosine | $\geq 10^5$ | $\geq 10^5$ |
| 50 ppm THPS | $\geq 10^4$ | $\geq 10^3$ |
| 50 ppm THPS + 1 ppm D-tyrosine | <10 | <10 |
| 100 ppm THPS | <10 | <10 |

Figure 14:
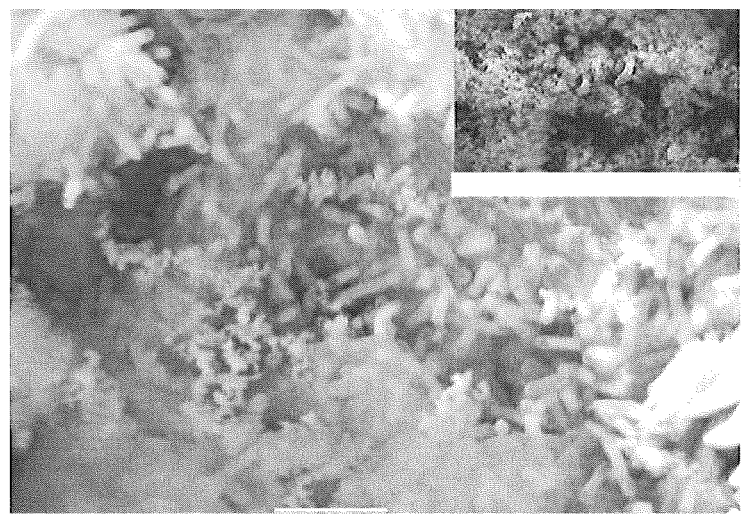
FIG. 14 shows an SEM image for a coupon (initially covered with mature SRB biofilms) after undergoing 3-h shock treatment with 50 ppm THPS+1 ppm D-tyrosine+1,000 ppm D-alanine (Scale bars for the small inset image are 50 μm.)

FIG. 14 shows that when a high concentration (1,000 ppm) of D-alanine was introduced to the 50 ppm THPS+1 ppm D-tyrosine combination cocktail, the combination cocktail was no longer effective because many SRB sessile cells can be seen in SEM image. This seems to suggest that the abundance of D-alanine inhibited the ability of D-tyrosine to replace the D-alanine terminals of the peptidoglycan in the bacterial cell walls. Moreover, it is interesting to note that D-tyrosine was found ineffective against *D. vulgaris* biofilm when used alone, even at a high concentration (100 ppm). This indicates that the SRB biofilm is far more recalcitrant than the *Bacillus subtilis*, *S. aureus*, and *P. aeruginosa* biofilms studied in the literature.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative compositions and processes, and illustrative examples shown and described. Accordingly, departures may be made from such details without departing from the spirit or scope of the applicant's general inventive concept.

What is claimed is:

1. A composition for treating the formation and growth of a biofilm comprising sulfate reducing bacteria on a substrate, the composition comprising:
   1 ppb to 1,000 ppm of at least one D-amino acid; and
   1 ppm to 60,000 ppm of at least one biocide, wherein the at least one biocide comprises tetrakis hydroxymethyl phosphonium sulfate (THPS).

2. The composition according to claim 1, wherein the D-amino acid is selected from the group consisting of D-tyrosine, D-methionine, D-tryptophan, D-leucine, D-arginine, D-histidine, D-lysine, D-aspartic acid, D-glutamic acid, D-serine, D-threonine, D-asparagine, D-glutamine, D-cysteine, D-proline, D-alanine, D-valine, D-isoleucine, D-phenylalanine, a non-standard D-amino acid, and combinations thereof.

3. The composition according to claim 1, wherein the D-amino acid is selected from the group consisting of D-tyrosine, D-methionine, D-tryptophan, D-leucine, and combinations thereof.

4. The composition according to claim 1, wherein the D-amino acid is D-tyrosine.

5. The composition according to claim 1, wherein the at least one biocide further comprises a biocide selected from the group consisting of glutaraldehyde, chlorine monoxide, chlorine dioxide, calcium hypochlorite, potassium hypochlorite, sodium hypochlorite, dibromonitriloproprionamide (DBNPA), methylene bis(thiocyanate) (MBT), 2-(thiocyanomethylthio)benzothiazole (TCMTB), bronopol, 2-bromo-2-nitro-1,3-propanediol (BNPD), tributyl tetradecyl phosphonium chloride (TTPC), taurinamide and derivatives thereof, phenols, quaternary ammonium salts, chlorine-containing agents, quinaldinium salts, lactones, organic dyes, thiosemicarbazones, quinones, carbamates, urea, salicylamide, carbanilide, guanide, amidines, imidazolines, acetic acid, benzoic acid, sorbic acid, propionic acid, boric acid, dehydroacetic acid, sulfurous acid, vanillic acid, p-hydroxybenzoate esters, isopropanol, propylene glycol, benzyl alcohol, chlorobutanol, phenylethyl alcohol, formaldehyde, iodine and solutions thereof, povidone-iodine, hexamethylenetetramine, noxythiolin, 1-(3-chloroallyl)-3,5,7-triazo-1-azoniaadamantane chloride, taurolidine, taurultam, N-(5-nitro-2-furfurylidene)-1-amino-hydantoin, 5-nitro-2-furaldehyde semicarbazone, 3,4,4'-trichlorocarbanilide, 3,4',5-tribromosalicylanilide, 3-trifluoromethyl-4,4'-dichlorocarbanilide, 8-hydroxyquinoline, 1-cyclopropyl-6-fluoro-1,4-dihydro-4-oxo-7-(1-piperazinyl)-3-quinolinecarboxylic acid, 1,4-dihydro-1-ethyl-6-fluoro-4-oxo-7-(1-piperazinyl)-3-quinolinecarboxylic acid, hydrogen peroxide, peracetic acid, sodium oxychlorosene, parachlorometaxylenol, 2,4,4'-trichloro-2'-hydroxydiphenol, thymol, chlorhexidine, benzalkonium chloride, cetylpyridinium chloride, silver sulfadiazine, silver nitrate, bromine, ozone, isothiazolones, polyoxyethylene (dimethylimino) ethylene (dimethylimino) ethylene dichloride, 2-(tert-butylamino)-4-chloro-6-ethylamino-S-triazine (terbutylazine), and combinations thereof.

6. A method for treating the formation and growth of a biofilm comprising sulfate reducing bacteria on a substrate, the method comprising:
   contacting the substrate with 1 ppb to 1,000 ppm of at least one D-amino acid and 1 ppm to 60,000 ppm of at least one biocide, wherein the at least one biocide comprises tetrakis hydroxymethyl phosphonium sulfate (THPS).

7. The method according to claim 6, wherein the substrate is one of a metal, a metal alloy, nylon, plastic, composite material, wood, glass, ceramic, porcelain, a painted surface, rock, or soil.

8. The method according to claim 6, wherein the substrate is selected from the group consisting of a pipe, a holding vessel, underground rock formations, underground soil formations, a ship hull, a wellbore, infrastructure, a beam, a trough, a girder, sheeting, prefabricated structures, and underwater structures.

9. The method according to claim 6, wherein the substrate is a pipe.

10. The method according to claim 6, wherein the at least one D-amino acid and the at least one biocide are separately and simultaneously added to a medium that contacts the substrate.

11. The method according to claim 6, wherein the at least one D-amino acid and the at least one biocide are in a solution that is added to a medium that contacts the substrate.

12. The method according to claim 6, wherein the at least one D-amino acid and the at least one biocide are separately and sequentially added to a medium that contacts the substrate.

13. The method according to claim 10, wherein the medium is selected from the group consisting of an oil, an aqueous solution, a hydraulic fracturing fluid, a fuel, carbon dioxide, a natural gas, an oil/water mixture, a fuel/water mixture, water containing salts, ocean or seawater, brackish water, sources of freshwater, lakes, rivers, stream, bogs, ponds, marshes, runoff from the thawing of snow or ice, springs, groundwater, aquifers, precipitation, any substance that is a liquid at ambient temperature and is hydrophobic but soluble in organic solvents, hexanes, benzene, toluene, chloroform, diethyl ether, vegetable oils, petrochemical oils, crude oil, refined petrochemical products, volatile essential oils, fossil fuels, gasoline, mixtures of hydrocarbons, jet and rocket fuels, biofuels, and combinations thereof.

14. The method according to claim 10, wherein the medium is an oil/water mixture.

15. The method according to claim 6, wherein the D-amino acid is selected from the group consisting of D-tyrosine, D-methionine, D-tryptophan, D-leucine, D-arginine, D-histidine, D-lysine, D-aspartic acid, D-glutamic acid, D-serine, D-threonine, D-asparagine, D-glutamine, D-cysteine, D-proline, D-alanine, D-valine, D-isoleucine, D-phenylalanine, a non-standard D-amino acid, and combinations thereof.

16. The method according to claim 6, wherein the D-amino acid is selected from the group consisting of D-tyrosine, D-methionine, D-tryptophan, D-leucine, and combinations thereof.

17. The method according to claim 6, wherein the at least one biocide further comprises a biocide selected from the group consisting of glutaraldehyde, chlorine monoxide, chlorine dioxide, calcium hypochlorite, potassium hypochlorite, sodium hypochlorite, dibromonitriloproprionamide (DBNPA), methylene bis(thiocyanate) (MBT), 2-(thiocyanomethylthio)benzothiazole (TCMTB), bronopol, 2-bromo-2-nitro-1,3-propanediol (BNPD), tributyl tetradecyl phosphonium chloride (TTPC), taurinamide and derivatives thereof, phenols, quaternary ammonium salts, chlorine-containing agents, quinaldinium salts, lactones, organic dyes, thiosemicarbazones, quinones, carbamates, urea, salicylamide, carbanilide, guanide, amidines, imidazolines, acetic acid, benzoic acid, sorbic acid, propionic acid, boric acid, dehydroacetic acid, sulfurous acid, vanillic acid, p-hydroxybenzoate esters, isopropanol, propylene glycol, benzyl alcohol, chlorobutanol, phenylethyl alcohol, formaldehyde, iodine and solutions thereof, povidone-iodine, hexamethylenetetramine, noxythiolin, 1-(3-chloroallyl)-3,5,7-triazo-1-azoniaadamantane chloride, taurolidine, taurultam, N-(5-nitro-2-furfurylidene)-1-amino-hydantoin, 5-nitro-2-furaldehyde semicarbazone, 3,4,4'-trichlorocarbanilide, 3,4', 5-tribromosalicylanilide, 3-trifluoromethyl-4,4'-dichlorocarbanilide, 8-hydroxyquinoline, 1-cyclopropyl-6-fluoro-1,4-dihydro-4-oxo-7-(1-piperazinyl)-3-quinolinecarboxylic acid, 1,4-dihydro-1-ethyl-6-fluoro-4-oxo-7-(1-piperazinyl)-3-quinolinecarboxylic acid, hydrogen peroxide, peracetic acid, sodium oxychlorosene, parachlorometaxylenol, 2,4,4'-trichloro-2'-hydroxydiphenol, thymol, chlorhexidine, benzalkonium chloride, cetylpyridinium chloride, silver sulfadiazine, silver nitrate, bromine, ozone, isothiazolones, polyoxyethylene (dimethylimino) ethylene (dimethylimino) ethylene dichloride, 2-(tert-butylamino)-4-chloro-6-ethylamino-S-triazine (terbuthylazine), and combinations thereof.

18. The method according to claim 6, wherein the biocide is 10 ppm to 1,000 ppm tetrakis hydroxymethyl phosphonium sulfate (THPS), and the D-amino acid is 100 ppb to 100 ppm D-tyrosine.

19. The method according to claim 6, wherein the biocide is 10 ppm to 1,000 ppm tetrakis hydroxymethyl phosphonium sulfate (THPS), and the D-amino acid is a 100 ppb to 100 ppm D-amino acid mixture comprising equimolar amounts of D-tyrosine, D-methionine, D-tryptophan, and D-leucine, and further comprising 100 ppm to 1,000 ppm of a surfactant.

* * * * *